(12) United States Patent
Richardson et al.

(10) Patent No.: US 8,458,360 B2
(45) Date of Patent: *Jun. 4, 2013

(54) REQUEST ROUTING UTILIZING CLIENT LOCATION INFORMATION

(75) Inventors: David R. Richardson, Seattle, WA (US); John Cormie, Seattle, WA (US); Imran S. Patel, Seattle, WA (US); Benjamin W. S. Redman, Seattle, WA (US); Richard Sheehan, Dublin (IE)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/620,915

(22) Filed: Sep. 15, 2012

(65) Prior Publication Data
US 2013/0013808 A1  Jan. 10, 2013

Related U.S. Application Data

(63) Continuation of application No. 13/232,878, filed on Sep. 14, 2011, which is a continuation of application No. 12/272,687, filed on Nov. 17, 2008, now Pat. No. 8,028,090.

(51) Int. Cl.
*G06F 15/173* (2006.01)
(52) U.S. Cl.
USPC ........... 709/238; 709/203; 709/217; 709/226; 709/230
(58) Field of Classification Search
USPC .......................... 709/203, 217, 225, 230, 238
See application file for complete search history.

(56) References Cited

U.S. PATENT DOCUMENTS

| | | | |
|---|---|---|---|
| 5,341,477 A | 8/1994 | Pitkin et al. | |
| 5,611,049 A | 3/1997 | Pitts | |

(Continued)

FOREIGN PATENT DOCUMENTS

| | | |
|---|---|---|
| CN | 1422468 A | 6/2003 |
| WO | WO 2007/007960 A1 | 1/2007 |
| WO | WO 2012/044587 A1 | 4/2012 |

OTHER PUBLICATIONS

American Bar Association; Digital Signature Guidelines Tutorial [online]; Feb. 10, 2002 [retrived on Feb. 3, 2010]; American Bar Association Section of Science and Technology Information Security Committee; Retrieved from the internet: <URL: http://web.archive.org/web/20020210124615/www.abanet.org/scitech/ec/isc/dsg-tutorial.html; pp. 1-8.

(Continued)

*Primary Examiner* — Alina N Boutah
(74) *Attorney, Agent, or Firm* — Knobbe, Martens, Olson & Bear, LLP

(57) ABSTRACT

A system, method, and computer-readable medium for request routing based on client location information are provided. A content delivery network service provider receives a DNS query from a client computing device. The DNS query corresponds to a resource identifier for requested content from the client computing device. The content delivery network service provider transmits an alternative resource identifier in response to the client computing device DNS query. The alternative resource identifier is selected as a function of client location information. The client location information is obtained from information corresponding to a mapping of at least partial IP addresses to known locations. The client computing device then issues a second DNS query to the same content delivery network service provider. The content delivery network service provider can then either resolve the second DNS query or transmit another alternative resource identifier.

22 Claims, 9 Drawing Sheets

U.S. PATENT DOCUMENTS

| | | |
|---|---|---|
| 5,774,660 A | 6/1998 | Brendel et al. |
| 5,892,914 A | 4/1999 | Pitts |
| 6,016,512 A | 1/2000 | Huitema |
| 6,026,452 A | 2/2000 | Pitts |
| 6,052,718 A | 4/2000 | Gifford |
| 6,085,234 A | 7/2000 | Pitts et al. |
| 6,098,096 A | 8/2000 | Tsirigotis et al. |
| 6,108,703 A | 8/2000 | Leighton et al. |
| 6,182,111 B1 | 1/2001 | Inohara et al. |
| 6,185,598 B1 | 2/2001 | Farber et al. |
| 6,192,051 B1 | 2/2001 | Lipman et al. |
| 6,205,475 B1 | 3/2001 | Pitts |
| 6,275,496 B1 | 8/2001 | Burns et al. |
| 6,286,043 B1 | 9/2001 | Cuomo et al. |
| 6,286,084 B1 | 9/2001 | Wexler et al. |
| 6,304,913 B1 | 10/2001 | Rune |
| 6,351,743 B1 | 2/2002 | DeArdo et al. |
| 6,351,775 B1 | 2/2002 | Yu |
| 6,363,411 B1 | 3/2002 | Dugan et al. |
| 6,366,952 B2 | 4/2002 | Pitts |
| 6,374,290 B1 | 4/2002 | Scharber et al. |
| 6,415,280 B1 | 7/2002 | Farber et al. |
| 6,457,047 B1 | 9/2002 | Chandra et al. |
| 6,484,143 B1 | 11/2002 | Swildens et al. |
| 6,505,241 B2 | 1/2003 | Pitts |
| 6,553,413 B1 | 4/2003 | Leighton et al. |
| 6,560,610 B1 | 5/2003 | Eatherton et al. |
| 6,611,873 B1 | 8/2003 | Kanehara |
| 6,654,807 B2 | 11/2003 | Farber et al. |
| 6,658,462 B1 | 12/2003 | Dutta |
| 6,678,791 B1 | 1/2004 | Jacobs et al. |
| 6,694,358 B1 | 2/2004 | Swildens et al. |
| 6,732,237 B1 | 5/2004 | Jacobs et al. |
| 6,754,699 B2 | 6/2004 | Swildens et al. |
| 6,754,706 B1 | 6/2004 | Swildens et al. |
| 6,769,031 B1 | 7/2004 | Bero |
| 6,785,704 B1 | 8/2004 | McCanne |
| 6,804,706 B2 | 10/2004 | Pitts |
| 6,829,654 B1 | 12/2004 | Jungck |
| 6,874,017 B1 | 3/2005 | Inoue et al. |
| 6,963,850 B1 | 11/2005 | Bezos et al. |
| 6,981,017 B1 | 12/2005 | Kasriel et al. |
| 6,986,018 B2 | 1/2006 | O'Rourke et al. |
| 6,990,526 B1 | 1/2006 | Zhu |
| 6,996,616 B1 | 2/2006 | Leighton et al. |
| 7,003,555 B1 | 2/2006 | Jungck |
| 7,006,099 B2 | 2/2006 | Gut et al. |
| 7,007,089 B2 | 2/2006 | Freedman |
| 7,010,578 B1 * | 3/2006 | Lewin et al. .................. 709/217 |
| 7,010,598 B2 | 3/2006 | Sitaraman et al. |
| 7,032,010 B1 | 4/2006 | Swildens et al. |
| 7,058,706 B1 | 6/2006 | Iyer et al. |
| 7,058,953 B2 | 6/2006 | Willard et al. |
| 7,065,587 B2 | 6/2006 | Huitema et al. |
| 7,072,982 B2 | 7/2006 | Teodosiu et al. |
| 7,082,476 B1 | 7/2006 | Cohen et al. |
| 7,086,061 B1 | 8/2006 | Joshi et al. |
| 7,092,505 B2 | 8/2006 | Allison et al. |
| 7,092,997 B1 | 8/2006 | Kasriel et al. |
| 7,099,936 B2 | 8/2006 | Chase et al. |
| 7,103,645 B2 | 9/2006 | Leighton et al. |
| 7,117,262 B2 | 10/2006 | Bai et al. |
| 7,133,905 B2 | 11/2006 | Dilley et al. |
| 7,143,169 B1 | 11/2006 | Champagne et al. |
| 7,146,560 B2 | 12/2006 | Dang et al. |
| 7,149,809 B2 | 12/2006 | Barde et al. |
| 7,152,118 B2 | 12/2006 | Anderson, IV et al. |
| 7,174,382 B2 | 2/2007 | Ramanathan et al. |
| 7,185,063 B1 | 2/2007 | Kasriel et al. |
| 7,188,214 B1 | 3/2007 | Kasriel et al. |
| 7,194,522 B1 | 3/2007 | Swildens et al. |
| 7,200,667 B2 | 4/2007 | Teodosiu et al. |
| 7,225,254 B1 | 5/2007 | Swildens et al. |
| 7,228,350 B2 | 6/2007 | Hong et al. |
| 7,233,978 B2 | 6/2007 | Overton et al. |
| 7,240,100 B1 | 7/2007 | Wein et al. |
| 7,254,636 B1 | 8/2007 | O'Toole, Jr. et al. |
| 7,260,598 B1 | 8/2007 | Liskov et al. |
| 7,269,784 B1 | 9/2007 | Kasriel et al. |
| 7,289,519 B1 | 10/2007 | Liskov |
| 7,293,093 B2 | 11/2007 | Leighton |
| 7,310,686 B2 | 12/2007 | Uysal |
| 7,316,648 B2 | 1/2008 | Kelly et al. |
| 7,320,131 B1 | 1/2008 | O'Toole, Jr. |
| 7,321,918 B2 | 1/2008 | Burd et al. |
| 7,363,291 B1 | 4/2008 | Page |
| 7,441,045 B2 * | 10/2008 | Skene et al. .................. 709/241 |
| 7,461,170 B1 | 12/2008 | Taylor et al. |
| 7,464,142 B2 | 12/2008 | Flurry et al. |
| 7,492,720 B2 | 2/2009 | Pruthi et al. |
| 7,499,998 B2 | 3/2009 | Toebes et al. |
| 7,502,836 B1 * | 3/2009 | Menditto et al. ............... 709/217 |
| 7,519,720 B2 | 4/2009 | Fishman et al. |
| 7,548,947 B2 | 6/2009 | Kasriel et al. |
| 7,552,235 B2 | 6/2009 | Chase et al. |
| 7,565,407 B1 | 7/2009 | Hayball |
| 7,573,916 B1 | 8/2009 | Bechtolsheim et al. |
| 7,624,169 B2 | 11/2009 | Lisiecki et al. |
| 7,650,376 B1 | 1/2010 | Blumenau |
| 7,653,700 B1 | 1/2010 | Bahl et al. |
| 7,657,622 B1 | 2/2010 | Douglis et al. |
| 7,680,897 B1 | 3/2010 | Carter et al. |
| 7,702,724 B1 | 4/2010 | Brydon et al. |
| 7,706,740 B2 | 4/2010 | Collins et al. |
| 7,707,314 B2 | 4/2010 | McCarthy et al. |
| 7,716,367 B1 | 5/2010 | Leighton et al. |
| 7,725,602 B2 | 5/2010 | Liu et al. |
| 7,739,400 B2 | 6/2010 | Lindbo et al. |
| 7,747,720 B2 | 6/2010 | Toebes et al. |
| 7,756,913 B1 | 7/2010 | Day |
| 7,761,572 B1 | 7/2010 | Auerbach |
| 7,769,823 B2 | 8/2010 | Jenny et al. |
| 7,773,596 B1 | 8/2010 | Marques |
| 7,774,342 B1 | 8/2010 | Virdy |
| 7,792,989 B2 | 9/2010 | Toebes et al. |
| 7,809,597 B2 | 10/2010 | Das et al. |
| 7,813,308 B2 | 10/2010 | Reddy et al. |
| 7,818,454 B2 | 10/2010 | Kim et al. |
| 7,836,177 B2 | 11/2010 | Kasriel et al. |
| 7,904,875 B2 | 3/2011 | Hegyi |
| 7,912,921 B2 | 3/2011 | O'Rourke et al. |
| 7,925,782 B2 | 4/2011 | Sivasubramanian et al. |
| 7,930,393 B1 | 4/2011 | Baumback et al. |
| 7,930,427 B2 | 4/2011 | Josefsberg et al. |
| 7,937,477 B1 | 5/2011 | Day et al. |
| 7,949,779 B2 | 5/2011 | Farber et al. |
| 7,962,597 B2 | 6/2011 | Richardson et al. |
| 7,966,404 B2 | 6/2011 | Hedin et al. |
| 7,979,509 B1 | 7/2011 | Malmskog et al. |
| 7,991,910 B2 * | 8/2011 | Richardson et al. .......... 709/238 |
| 7,996,535 B2 | 8/2011 | Auerbach |
| 8,000,724 B1 | 8/2011 | Rayburn et al. |
| 8,028,090 B2 * | 9/2011 | Richardson et al. .......... 709/238 |
| 8,065,275 B2 | 11/2011 | Eriksen et al. |
| 8,073,940 B1 | 12/2011 | Richardson et al. |
| 8,082,348 B1 | 12/2011 | Averbuj et al. |
| 8,117,306 B1 | 2/2012 | Baumback et al. |
| 8,122,098 B1 | 2/2012 | Richardson et al. |
| 8,234,403 B2 * | 7/2012 | Richardson et al. .......... 709/238 |
| 8,321,568 B2 | 11/2012 | Sivasubramanian et al. |
| 2001/0032133 A1 | 10/2001 | Moran |
| 2001/0034704 A1 | 10/2001 | Farhat et al. |
| 2001/0049741 A1 | 12/2001 | Skene et al. |
| 2001/0056416 A1 | 12/2001 | Garcia-Luna-Aceves |
| 2001/0056500 A1 | 12/2001 | Farber et al. |
| 2002/0007413 A1 | 1/2002 | Garcia-Luna-Aceves et al. |
| 2002/0048269 A1 | 4/2002 | Hong et al. |
| 2002/0049608 A1 | 4/2002 | Hartsell et al. |
| 2002/0052942 A1 | 5/2002 | Swildens et al. |
| 2002/0062372 A1 | 5/2002 | Hong et al. |
| 2002/0068554 A1 | 6/2002 | Dusse |
| 2002/0069420 A1 | 6/2002 | Russell et al. |
| 2002/0078233 A1 * | 6/2002 | Biliris et al. .................. 709/238 |
| 2002/0083118 A1 | 6/2002 | Sim |
| 2002/0083148 A1 | 6/2002 | Shaw et al. |
| 2002/0087374 A1 | 7/2002 | Boubez et al. |
| 2002/0092026 A1 | 7/2002 | Janniello et al. |

| | | | | | | |
|---|---|---|---|---|---|---|
| 2002/0099616 A1 | 7/2002 | Sweldens | 2005/0188073 A1 | 8/2005 | Nakamichi et al. | |
| 2002/0099850 A1 | 7/2002 | Farber et al. | 2005/0192008 A1 | 9/2005 | Desai et al. | |
| 2002/0101836 A1 | 8/2002 | Dorenbosch | 2005/0216569 A1 | 9/2005 | Coppola et al. | |
| 2002/0107944 A1 | 8/2002 | Bai et al. | 2005/0216674 A1 | 9/2005 | Robbin et al. | |
| 2002/0116481 A1 | 8/2002 | Lee | 2005/0232165 A1 | 10/2005 | Brawn et al. | |
| 2002/0124098 A1 | 9/2002 | Shaw | 2005/0259672 A1 | 11/2005 | Eduri | |
| 2002/0129123 A1 | 9/2002 | Johnson et al. | 2005/0262248 A1 | 11/2005 | Jennings, III et al. | |
| 2002/0138286 A1 | 9/2002 | Engstrom | 2005/0267991 A1 | 12/2005 | Huitema et al. | |
| 2002/0138437 A1 | 9/2002 | Lewin et al. | 2005/0267992 A1 | 12/2005 | Huitema et al. | |
| 2002/0143989 A1 | 10/2002 | Huitema et al. | 2005/0267993 A1 | 12/2005 | Huitema et al. | |
| 2002/0147770 A1 | 10/2002 | Tang | 2005/0278259 A1 | 12/2005 | Gunaseelan et al. | |
| 2002/0156911 A1 | 10/2002 | Croman et al. | 2006/0013158 A1 | 1/2006 | Ahuja et al. | |
| 2002/0161767 A1 | 10/2002 | Shapiro et al. | 2006/0020596 A1 | 1/2006 | Liu et al. | |
| 2002/0163882 A1 | 11/2002 | Bornstein et al. | 2006/0020684 A1 | 1/2006 | Mukherjee et al. | |
| 2002/0188722 A1 | 12/2002 | Banerjee et al. | 2006/0020715 A1 | 1/2006 | Jungck | |
| 2003/0002484 A1 | 1/2003 | Freedman | 2006/0026067 A1 | 2/2006 | Nicholas et al. | |
| 2003/0009591 A1 | 1/2003 | Hayball et al. | 2006/0026154 A1 | 2/2006 | Altinel et al. | |
| 2003/0033283 A1 | 2/2003 | Evans et al. | 2006/0036720 A1 | 2/2006 | Faulk, Jr. | |
| 2003/0037139 A1 | 2/2003 | Shteyn | 2006/0037037 A1 | 2/2006 | Miranz | |
| 2003/0065739 A1 | 4/2003 | Shnier | 2006/0041614 A1 | 2/2006 | Oe | |
| 2003/0074401 A1 | 4/2003 | Connell et al. | 2006/0047787 A1 | 3/2006 | Agarwal et al. | |
| 2003/0099202 A1 | 5/2003 | Lear et al. | 2006/0063534 A1 | 3/2006 | Kokkonen et al. | |
| 2003/0101278 A1 | 5/2003 | Garcia-Luna-Aceves et al. | 2006/0064500 A1 | 3/2006 | Roth et al. | |
| 2003/0120741 A1 | 6/2003 | Wu et al. | 2006/0074750 A1 | 4/2006 | Clark et al. | |
| 2003/0133554 A1 | 7/2003 | Nykanen et al. | 2006/0075084 A1 | 4/2006 | Lyon | |
| 2003/0135509 A1 | 7/2003 | Davis et al. | 2006/0075139 A1 | 4/2006 | Jungck | |
| 2003/0140087 A1 | 7/2003 | Lincoln et al. | 2006/0083165 A1 | 4/2006 | McLane et al. | |
| 2003/0145066 A1 | 7/2003 | Okada et al. | 2006/0112176 A1* | 5/2006 | Liu et al. | 709/223 |
| 2003/0149581 A1 | 8/2003 | Chaudhri et al. | 2006/0120385 A1 | 6/2006 | Atchison et al. | |
| 2003/0163722 A1 | 8/2003 | Anderson, IV | 2006/0143293 A1 | 6/2006 | Freedman | |
| 2003/0172183 A1 | 9/2003 | Anderson, IV et al. | 2006/0155823 A1 | 7/2006 | Tran et al. | |
| 2003/0174648 A1 | 9/2003 | Wang et al. | 2006/0161541 A1 | 7/2006 | Cencini | |
| 2003/0182413 A1 | 9/2003 | Allen et al. | 2006/0168088 A1 | 7/2006 | Leighton et al. | |
| 2003/0187935 A1 | 10/2003 | Agarwalla et al. | 2006/0190605 A1 | 8/2006 | Franz et al. | |
| 2003/0187970 A1 | 10/2003 | Chase et al. | 2006/0193247 A1 | 8/2006 | Naseh et al. | |
| 2003/0191822 A1 | 10/2003 | Leighton et al. | 2006/0195866 A1 | 8/2006 | Thukral | |
| 2003/0200394 A1 | 10/2003 | Ashmore et al. | 2006/0227740 A1 | 10/2006 | McLaughlin et al. | |
| 2003/0204602 A1 | 10/2003 | Hudson et al. | 2006/0230137 A1 | 10/2006 | Gare et al. | |
| 2003/0229682 A1 | 12/2003 | Day | 2006/0233155 A1* | 10/2006 | Srivastava | 370/351 |
| 2003/0233423 A1 | 12/2003 | Dilley et al. | 2006/0253546 A1 | 11/2006 | Chang et al. | |
| 2003/0236700 A1 | 12/2003 | Arning et al. | 2006/0253609 A1 | 11/2006 | Andreev et al. | |
| 2004/0010621 A1 | 1/2004 | Afergan et al. | 2006/0259690 A1 | 11/2006 | Vittal et al. | |
| 2004/0019518 A1 | 1/2004 | Abraham et al. | 2006/0259984 A1 | 11/2006 | Juneau | |
| 2004/0024841 A1 | 2/2004 | Becker et al. | 2006/0265508 A1* | 11/2006 | Angel et al. | 709/230 |
| 2004/0030620 A1 | 2/2004 | Benjamin et al. | 2006/0265516 A1 | 11/2006 | Schilling | |
| 2004/0034744 A1 | 2/2004 | Karlsson et al. | 2006/0265720 A1 | 11/2006 | Cai et al. | |
| 2004/0039798 A1 | 2/2004 | Hotz et al. | 2006/0271641 A1 | 11/2006 | Stavrakos et al. | |
| 2004/0044791 A1 | 3/2004 | Pouzzner | 2006/0282522 A1 | 12/2006 | Lewin et al. | |
| 2004/0064501 A1 | 4/2004 | Jan et al. | 2007/0005689 A1 | 1/2007 | Leighton et al. | |
| 2004/0073596 A1 | 4/2004 | Kloninger et al. | 2007/0005892 A1 | 1/2007 | Mullender et al. | |
| 2004/0073867 A1 | 4/2004 | Kausik et al. | 2007/0011267 A1 | 1/2007 | Overton et al. | |
| 2004/0078468 A1 | 4/2004 | Hedin et al. | 2007/0014241 A1 | 1/2007 | Banerjee et al. | |
| 2004/0078487 A1 | 4/2004 | Cernohous et al. | 2007/0038994 A1 | 2/2007 | Davis et al. | |
| 2004/0083307 A1 | 4/2004 | Uysal | 2007/0041393 A1 | 2/2007 | Westhead et al. | |
| 2004/0117455 A1 | 6/2004 | Kaminsky et al. | 2007/0043859 A1 | 2/2007 | Ruul | |
| 2004/0128344 A1 | 7/2004 | Trossen | 2007/0050522 A1 | 3/2007 | Grove et al. | |
| 2004/0128346 A1 | 7/2004 | Melamed et al. | 2007/0055764 A1 | 3/2007 | Dilley et al. | |
| 2004/0167981 A1 | 8/2004 | Douglas et al. | 2007/0076872 A1 | 4/2007 | Juneau | |
| 2004/0172466 A1 | 9/2004 | Douglas et al. | 2007/0094361 A1 | 4/2007 | Hoynowski et al. | |
| 2004/0194085 A1 | 9/2004 | Beaubien et al. | 2007/0101377 A1 | 5/2007 | Six et al. | |
| 2004/0203630 A1 | 10/2004 | Wang | 2007/0118667 A1 | 5/2007 | McCarthy et al. | |
| 2004/0205149 A1 | 10/2004 | Dillon et al. | 2007/0118668 A1 | 5/2007 | McCarthy et al. | |
| 2004/0205162 A1 | 10/2004 | Parikh | 2007/0134641 A1 | 6/2007 | Lieu | |
| 2004/0215823 A1 | 10/2004 | Kleinfelter et al. | 2007/0168517 A1 | 7/2007 | Weller et al. | |
| 2004/0249971 A1 | 12/2004 | Klinker | 2007/0174426 A1* | 7/2007 | Swildens et al. | 709/217 |
| 2004/0249975 A1 | 12/2004 | Tuck et al. | 2007/0174442 A1 | 7/2007 | Sherman et al. | |
| 2004/0267906 A1 | 12/2004 | Truty | 2007/0174490 A1 | 7/2007 | Choi et al. | |
| 2004/0267907 A1 | 12/2004 | Gustafsson | 2007/0183342 A1 | 8/2007 | Wong et al. | |
| 2005/0010653 A1 | 1/2005 | McCanne | 2007/0208737 A1 | 9/2007 | Li et al. | |
| 2005/0021706 A1 | 1/2005 | Maggi et al. | 2007/0219795 A1 | 9/2007 | Park et al. | |
| 2005/0038967 A1 | 2/2005 | Umbehocker et al. | 2007/0220010 A1 | 9/2007 | Ertugrul | |
| 2005/0044270 A1 | 2/2005 | Grove et al. | 2007/0244964 A1 | 10/2007 | Challenger et al. | |
| 2005/0108169 A1 | 5/2005 | Balasubramanian et al. | 2007/0250467 A1 | 10/2007 | Mesnik et al. | |
| 2005/0108529 A1 | 5/2005 | Juneau | 2007/0250560 A1 | 10/2007 | Wein et al. | |
| 2005/0114296 A1 | 5/2005 | Farber et al. | 2007/0253377 A1 | 11/2007 | Janneteau et al. | |
| 2005/0132083 A1 | 6/2005 | Raciborski et al. | 2007/0266113 A1 | 11/2007 | Koopmans et al. | |
| 2005/0157712 A1 | 7/2005 | Rangarajan et al. | 2007/0266311 A1 | 11/2007 | Westphal | |
| 2005/0163168 A1 | 7/2005 | Sheth et al. | 2007/0266333 A1 | 11/2007 | Cossey et al. | |
| 2005/0171959 A1 | 8/2005 | Deforche et al. | 2007/0271385 A1 | 11/2007 | Davis et al. | |

| | | |
|---|---|---|
| 2007/0280229 A1 | 12/2007 | Kenney |
| 2007/0288588 A1 | 12/2007 | Wein et al. |
| 2008/0005057 A1 | 1/2008 | Ozzie et al. |
| 2008/0008089 A1 | 1/2008 | Bornstein et al. |
| 2008/0025304 A1 | 1/2008 | Venkataswami et al. |
| 2008/0046596 A1 | 2/2008 | Afergan et al. |
| 2008/0065724 A1 | 3/2008 | Seed et al. |
| 2008/0065745 A1 | 3/2008 | Leighton et al. |
| 2008/0071859 A1 | 3/2008 | Seed et al. |
| 2008/0071987 A1 | 3/2008 | Karn et al. |
| 2008/0072264 A1 | 3/2008 | Crayford |
| 2008/0082551 A1 | 4/2008 | Farber et al. |
| 2008/0086574 A1 * | 4/2008 | Raciborski et al. ........... 709/245 |
| 2008/0103805 A1 | 5/2008 | Shear et al. |
| 2008/0114829 A1 | 5/2008 | Button et al. |
| 2008/0134043 A1 | 6/2008 | Georgis et al. |
| 2008/0147866 A1 | 6/2008 | Stolorz et al. |
| 2008/0147873 A1 | 6/2008 | Matsumoto |
| 2008/0155061 A1 | 6/2008 | Afergan et al. |
| 2008/0155614 A1 | 6/2008 | Cooper et al. |
| 2008/0162667 A1 | 7/2008 | Verma et al. |
| 2008/0189437 A1 | 8/2008 | Halley |
| 2008/0201332 A1 | 8/2008 | Souders et al. |
| 2008/0215718 A1 | 9/2008 | Stolorz et al. |
| 2008/0215735 A1 | 9/2008 | Farber et al. |
| 2008/0215750 A1 | 9/2008 | Farber et al. |
| 2008/0222281 A1 | 9/2008 | Dilley et al. |
| 2008/0222291 A1 | 9/2008 | Weller et al. |
| 2008/0222295 A1 | 9/2008 | Robinson et al. |
| 2008/0228920 A1 | 9/2008 | Souders et al. |
| 2008/0235400 A1 | 9/2008 | Slocombe et al. |
| 2008/0275772 A1 | 11/2008 | Suryanarayana et al. |
| 2008/0281950 A1 | 11/2008 | Wald et al. |
| 2008/0288722 A1 | 11/2008 | Lecoq et al. |
| 2008/0301670 A1 | 12/2008 | Gouge et al. |
| 2008/0319862 A1 | 12/2008 | Golan et al. |
| 2009/0013063 A1 | 1/2009 | Soman |
| 2009/0016236 A1 | 1/2009 | Alcala et al. |
| 2009/0029644 A1 | 1/2009 | Sue et al. |
| 2009/0031367 A1 | 1/2009 | Sue |
| 2009/0031368 A1 | 1/2009 | Ling |
| 2009/0031376 A1 | 1/2009 | Riley et al. |
| 2009/0049098 A1 | 2/2009 | Pickelsimer et al. |
| 2009/0070533 A1 | 3/2009 | Elazary et al. |
| 2009/0086741 A1 | 4/2009 | Zhang |
| 2009/0103707 A1 | 4/2009 | McGary et al. |
| 2009/0106381 A1 | 4/2009 | Kasriel et al. |
| 2009/0112703 A1 | 4/2009 | Brown |
| 2009/0125934 A1 | 5/2009 | Jones et al. |
| 2009/0132368 A1 | 5/2009 | Cotter et al. |
| 2009/0132648 A1 | 5/2009 | Swildens et al. |
| 2009/0144412 A1 | 6/2009 | Ferguson et al. |
| 2009/0150926 A1 | 6/2009 | Schlack |
| 2009/0157850 A1 | 6/2009 | Gagliardi et al. |
| 2009/0158163 A1 | 6/2009 | Stephens et al. |
| 2009/0164331 A1 | 6/2009 | Bishop et al. |
| 2009/0177667 A1 | 7/2009 | Ramos et al. |
| 2009/0182815 A1 | 7/2009 | Czechowski et al. |
| 2009/0182945 A1 | 7/2009 | Aviles et al. |
| 2009/0187575 A1 | 7/2009 | DaCosta |
| 2009/0204682 A1 | 8/2009 | Jeyaseelan et al. |
| 2009/0210549 A1 | 8/2009 | Hudson et al. |
| 2009/0248852 A1 | 10/2009 | Fuhrmann et al. |
| 2009/0248858 A1 | 10/2009 | Sivasubramanian et al. |
| 2009/0248893 A1 | 10/2009 | Richardson et al. |
| 2009/0259971 A1 | 10/2009 | Rankine et al. |
| 2009/0271577 A1 | 10/2009 | Campana et al. |
| 2009/0271730 A1 | 10/2009 | Rose et al. |
| 2009/0279444 A1 | 11/2009 | Ravindran et al. |
| 2009/0287750 A1 | 11/2009 | Banavar et al. |
| 2009/0307307 A1 | 12/2009 | Igarashi |
| 2010/0005175 A1 | 1/2010 | Swildens et al. |
| 2010/0011061 A1 | 1/2010 | Hudson et al. |
| 2010/0023601 A1 | 1/2010 | Lewin et al. |
| 2010/0030662 A1 | 2/2010 | Klein |
| 2010/0036944 A1 | 2/2010 | Douglis et al. |
| 2010/0070603 A1 | 3/2010 | Moss et al. |
| 2010/0088367 A1 | 4/2010 | Brown et al. |
| 2010/0100629 A1 | 4/2010 | Raciborski et al. |
| 2010/0111059 A1 | 5/2010 | Bappu et al. |
| 2010/0121953 A1 | 5/2010 | Friedman et al. |
| 2010/0122069 A1 | 5/2010 | Gonion |
| 2010/0150155 A1 | 6/2010 | Napierala |
| 2010/0192225 A1 | 7/2010 | Ma et al. |
| 2010/0217801 A1 | 8/2010 | Leighton et al. |
| 2010/0226372 A1 | 9/2010 | Watanabe |
| 2010/0257566 A1 | 10/2010 | Matila |
| 2010/0293479 A1 | 11/2010 | Rousso et al. |
| 2010/0299439 A1 | 11/2010 | McCarthy et al. |
| 2010/0332595 A1 | 12/2010 | Fullagar et al. |
| 2011/0040893 A1 | 2/2011 | Karaoguz et al. |
| 2011/0078000 A1 | 3/2011 | Ma et al. |
| 2011/0078230 A1 | 3/2011 | Sepulveda |
| 2011/0153941 A1 | 6/2011 | Spatscheck et al. |
| 2011/0238501 A1 | 9/2011 | Almeida |
| 2011/0252142 A1 | 10/2011 | Richardson et al. |
| 2011/0258049 A1 | 10/2011 | Ramer et al. |
| 2011/0276623 A1 | 11/2011 | Girbal |
| 2012/0066360 A1 | 3/2012 | Ghosh |
| 2012/0179839 A1 | 7/2012 | Raciborski et al. |

OTHER PUBLICATIONS

Baglioni et al., "Preprocessing and Mining Web Log Data for Web Personalization", LNAI 2829, 2003, pp. 237-249.
First Office Action in Chinese Application No. 200980119993.1 dated Jul. 4, 2012.
First Office Action in Chinese Application No. 200980119995.0 dated Jul. 6, 2012.
International Search Report and Written Opinion in PCT/US2011/053302 mailed Nov. 28, 2011 in 11 pages.
International Search Report and Written Opinion in PCT/US2011/061486 mailed Mar. 30, 2012 in 11 pages.
Liu et al., "Combined mining of Web server logs and web contents for classifying user navigation patterns and predicting users' future requests," Data & Knowledge Engineering 61 (2007) pp. 304-330.
Singapore Examination Report in Application No. 201006837-7 mailed May 16, 2012.
Singapore Written Opinion in Application No. 201006836-9, mailed Apr. 30, 2012 in 10 pages.
Singapore Written Opinion in Application No. 201006836-9, mailed Oct. 12, 2011 in 12 pages.
Singapore Written Opinion in Application No. 201006837-7, mailed Oct. 12, 2011 in 11 pages.
Singapore Written Opinion in Application No. 201006874-0, mailed Oct. 12, 2011 in 10 pages.
Supplementary European Search Report in Application No. 09727694.3 mailed Jan. 30, 2012 in 6 pages.
Tan et al., "Classification: Basic Concepts, Decision Tree, and Model Evaluation", Introduction in Data Mining; http://www-users.cs.umn.edu/~kumar/dmbook/ch4.pdf, 2005, pp. 245-205.
Xu et al., "Decision tree regression for soft classification of remote sensing data", Remote Sensing of Environment 97 (2005) pp. 322-336.

* cited by examiner

REQUEST ROUTING UTILIZING CLIENT LOCATION INFORMATION

CROSS-REFERENCE TO RELATED APPLICATIONS

This application is a continuation of U.S. application Ser. No. 13/232,878 entitled "REQUEST ROUTING UTILIZING CLIENT LOCATION INFORMATION" and filed on Sep. 14, 2011, which in turn is a continuation of U.S. patent application Ser. No. 12/272,687, now U.S. Pat. No. 8,028,090, entitled "REQUEST ROUTING UTILIZING CLIENT LOCATION INFORMATION" and filed on Nov. 17, 2008, which in turn is related to U.S. application Ser. No. 11/771,679, filed on Jun. 29, 2007 and entitled "MAPPING ATTRIBUTES TO NETWORK ADDRESSES," the disclosures of which are herein incorporated by reference.

BACKGROUND

Generally described, computing devices and communication networks can be utilized to exchange information. In a common application, a computing device can request content from another computing device via the communication network. For example, a user at a personal computing device can utilize a software browser application to request a Web page from a server computing device via the Internet. In such embodiments, the user computing device can be referred to as a client computing device and the server computing device can be referred to as a content provider.

Content providers are generally motivated to provide requested content to client computing devices often with consideration of efficient transmission of the requested content to the client computing device and/or consideration of a cost associated with the transmission of the content. For larger scale implementations, a content provider may receive content requests from a high volume of client computing devices which can place a strain on the content provider's computing resources. Additionally, the content requested by the client computing devices may have a number of components, which can further place additional strain on the content provider's computing resources.

With reference to an illustrative example, a requested Web page, or original content, may be associated with a number of additional resources, such as images or videos, which are to be displayed with the Web page. In one specific embodiment, the additional resources of the Web page are identified by a number of embedded resource identifiers, such as uniform resource locators ("URLs"). In turn, software on the client computing devices typically processes embedded resource identifiers to generate requests for the content. Often, the resource identifiers associated with the embedded resources reference a computing device associated with the content provider such that the client computing device would transmit the request for the additional resources to the referenced content provider computing device. Accordingly, in order to satisfy a content request, the content provider would provide client computing devices data associated with the Web page as well as the data associated with the embedded resources.

Some content providers attempt to facilitate the delivery of requested content, such as Web pages and/or resources identified in Web pages, through the utilization of a content delivery network ("CDN") service provider. A CDN server provider typically maintains a number of computing devices in a communication network that can maintain content from various content providers. In turn, content providers can instruct, or otherwise suggest to, client computing devices to request some, or all, of the content provider's content from the CDN service provider's computing devices.

As with content providers, CDN service providers are also generally motivated to provide requested content to client computing devices often with consideration of efficient transmission of the requested content to the client computing device and/or consideration of a cost associated with the transmission of the content. Accordingly, CDN service providers often consider factors such as latency of delivery of requested content in order to meet service level agreements or to generally improve the quality of delivery service.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Generally described, the present disclosure is directed to routing of DNS queries from a client computing device corresponding to content requests by a network resource, such as content delivery network ("CDN") service providers. The processing of a DNS query by a CDN service provider is generally referred to as request routing. Specifically, aspects of the disclosure will be described with regard to the routing of a client computing device DNS query within a content delivery network service provider domain as a function of client location information associated with the processing of the content request from the client computing device. In one embodiment, a CDN service provider utilizes query IP address to location-based identifier mappings to select components of a CDN network to provide the requested resource. The CDN network component can be selected by identifying a client computing device's location and attempting to improve performance associated with the request routing by transmitting requested resources from a CDN network component in a destination associated with the client's location. Although various aspects of the disclosure will be described with regard to illustrative examples and embodiments, one skilled in the art will appreciate that the disclosed embodiments and examples should not be construed as limiting.

Figure 1:
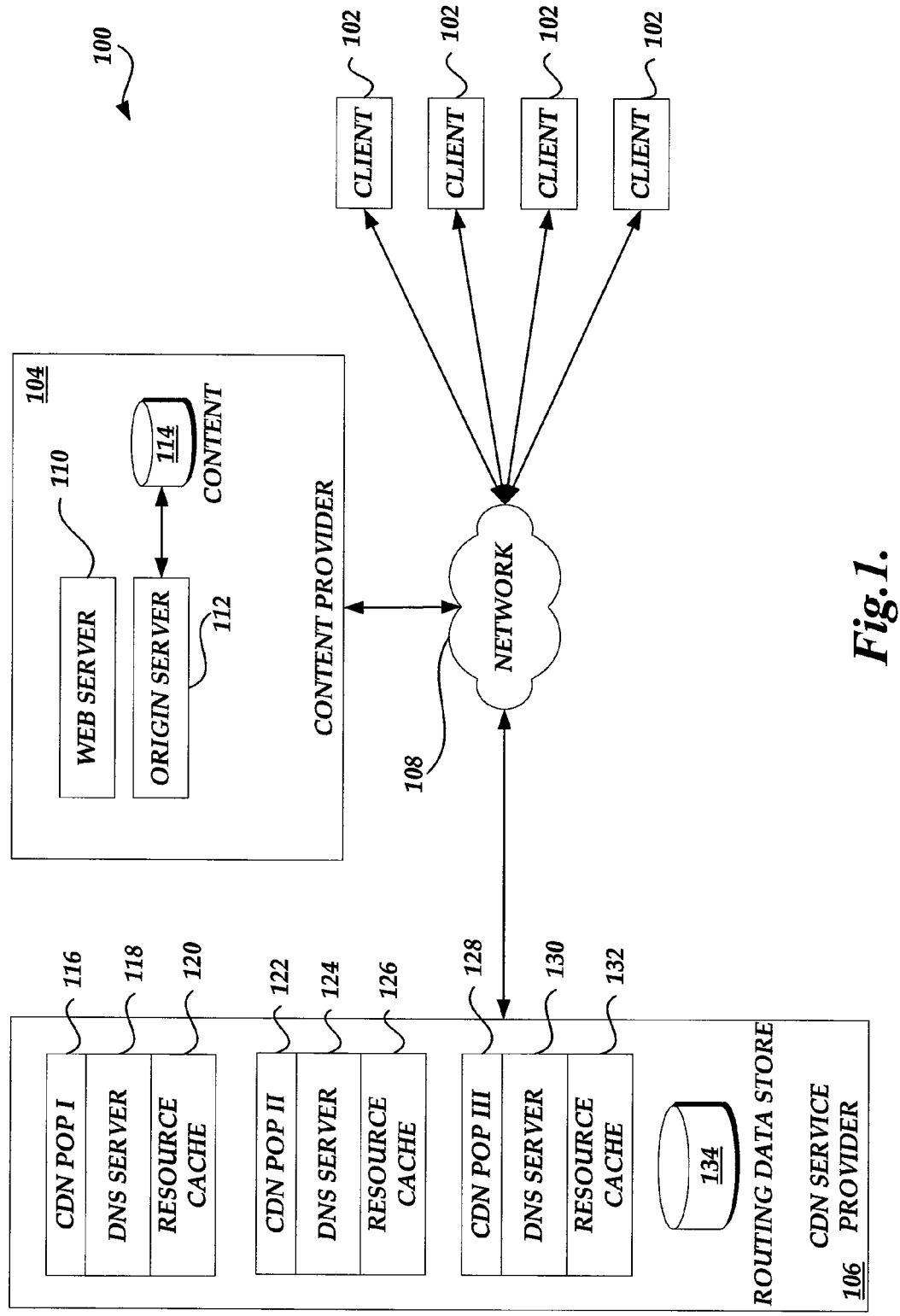
FIG. 1 is a block diagram illustrative of content delivery environment including a number of client computing devices, a content provider, and a content delivery network service provider.

FIG. 1 is a block diagram illustrative of content delivery environment 100 for the management and processing of content requests. As illustrated in FIG. 1, the content delivery environment 100 includes a number of client computing devices 102 (generally referred to as clients) for requesting content from a content provider and/or a CDN service provider. In an illustrative embodiment, the client computing devices 102 can correspond to a wide variety of computing devices including personal computing devices, laptop computing devices, hand-held computing devices, terminal computing devices, mobile devices, wireless devices, various electronic devices and appliances and the like. In an illustrative embodiment, the client computing devices 102 include necessary hardware and software components for establishing communications over a communication network 108, such as a wide area network or local area network. For example, the client computing devices 102 may be equipped with networking equipment and browser software applications that facilitate communications via the Internet or an intranet.

Although not illustrated in FIG. 1, each client computing device 102 utilizes some type of local DNS resolver component, such as a DNS name server, that generates the DNS queries attributed to the client computing device. In one embodiment, the local DNS resolver component may be provided by an enterprise network to which the client computing device 102 belongs. In another embodiment, the local DNS resolver component may be provided by an Internet Service Provider (ISP) that provides the communication network connection to the client computing device 102.

The content delivery environment 100 can also include a content provider 104 in communication with the one or more client computing devices 102 via the communication network 108. The content provider 104 illustrated in FIG. 1 corresponds to a logical association of one or more computing devices associated with a content provider. Specifically, the content provider 104 can include a web server component 110 corresponding to one or more server computing devices for obtaining and processing requests for content (such as Web pages) from the client computing devices 102. The content provider 104 can further include an origin server component 112 and associated storage component 114 corresponding to one or more computing devices for obtaining and processing requests for network resources from the CDN service provider. One skilled in the relevant art will appreciate that the content provider 104 can be associated with various additional computing resources, such additional computing devices for administration of content and resources, DNS name servers, and the like. For example, although not illustrated in FIG. 1, the content provider 104 can be associated with one or more DNS name server components that are operative to receive DNS queries related to registered domain names associated with the content provider. The one or more DNS name servers can be authoritative to resolve client computing device DNS queries corresponding to the registered domain names of the content provider 104. A DNS name server component is considered to be authoritative to a DNS query if the DNS name server can resolve the query by providing a responsive IP address.

With continued reference to FIG. 1, the content delivery environment 100 can further include a CDN service provider 106 in communication with the one or more client computing devices 102 and the content providers 104 via the communication network 108. The CDN service provider 106 illustrated in FIG. 1 corresponds to a logical association of one or more computing devices associated with a CDN service provider. Specifically, the CDN service provider 106 can include a number of Point of Presence ("POP") locations 116, 122, 128 that correspond to nodes on the communication network 108. Each POP 116, 122, 128 includes a DNS component 118, 124, 130 made up of a number of DNS server computing devices for resolving DNS queries from the client computers 102. Each POP 116, 122, 128 also includes a resource cache component 120, 126, 132 made up of a number of cache server computing devices for storing resources from content providers and transmitting various requested resources to various client computers.

Still further, the CDN service provider 106 includes a routing data store 134 for maintaining information regarding query IP address to location-based identifier mappings, as well as confidence factors associated with those mappings, such as disclosed in U.S. application Ser. No. 11/771,679, which is herein incorporated by reference. In some embodiments, the location-based identifiers can correspond to locations directly determined based on physical locations or logical locations associated with the origin of the DNS query. In addition or alternatively, the location-based identifier can be inferred based on associating a relative location to known locations. For example, the location-based identifier can be attributed to known locations of POPs (corresponding to the CDN service provider) based on measured latency information associated with request routing between the client computing device or its local DNS resolver and these POPs. The measured latency information can be premeasured, such as through testing procedures or previously observed request routing behavior. Alternatively, the measured latency information can be dynamically measured in a real time basis or semi-real time basis.

The routing data store 134 can also maintain additional location mapping information such as mappings of the location-based identifiers to regional CDN destination identifiers. Even further, the location mapping data store 134 can include information identifying a set of POPs associated with each CDN destination identifier. Yet further, the routing data store 134 can include user profile information from which alternative user location information may be obtained. Yet still further, the routing data store 134 can include content provider routing criteria associated with a content provider identifier (or origin identifier), such as regional service plan information or other routing criteria, utilized by the CDN service provider 106 to route content requests.

In an illustrative embodiment, the routing data store 134 corresponds to a central data store accessible by the POPs 116, 122, 128, such as via a Web service. In another embodiment, each POP 116, 122, 128 can maintain a local version of a routing data store 134 for utilization in request routing as will be explained in greater detail. Additionally, although the routing data store 134 is illustrated as a single data store, one skilled in the relevant art will appreciate that routing data store 134 may correspond to one or more data stores and may be implemented in a distributed manner.

The DNS components 118, 124 and 130 and the resource cache components 120, 126 132 may further include additional software and/or hardware components that facilitate communications including, but not limited, load balancing or load sharing software/hardware components.

In an illustrative embodiment, the DNS component 118, 124, 130 and resource cache component 120, 126, 132 are considered to be logically grouped, regardless of whether the components, or portions of the components, are physically separate. Additionally, although the POPs 116, 122, 128 are illustrated in FIG. 1 as logically associated with the CDN service provider 106, the POPs will be geographically distributed throughout the communication network 108 in a manner to best serve various demographics of client computing devices 102. Additionally, one skilled in the relevant art will appreciate that the CDN service provider 106 can be associated with various additional computing resources, such additional computing devices for administration of content and resources, and the like.

One skilled in the relevant art will appreciate that the components and configurations provided in FIG. 1 are illustrative in nature. Accordingly, additional or alternative components and/or configurations, especially regarding the additional components, systems and subsystems for facilitating communications may be utilized.

With reference now to FIGS. 2-6, the interaction between various components of the content delivery environment 100 of FIG. 1 will be illustrated. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

Figure 2:
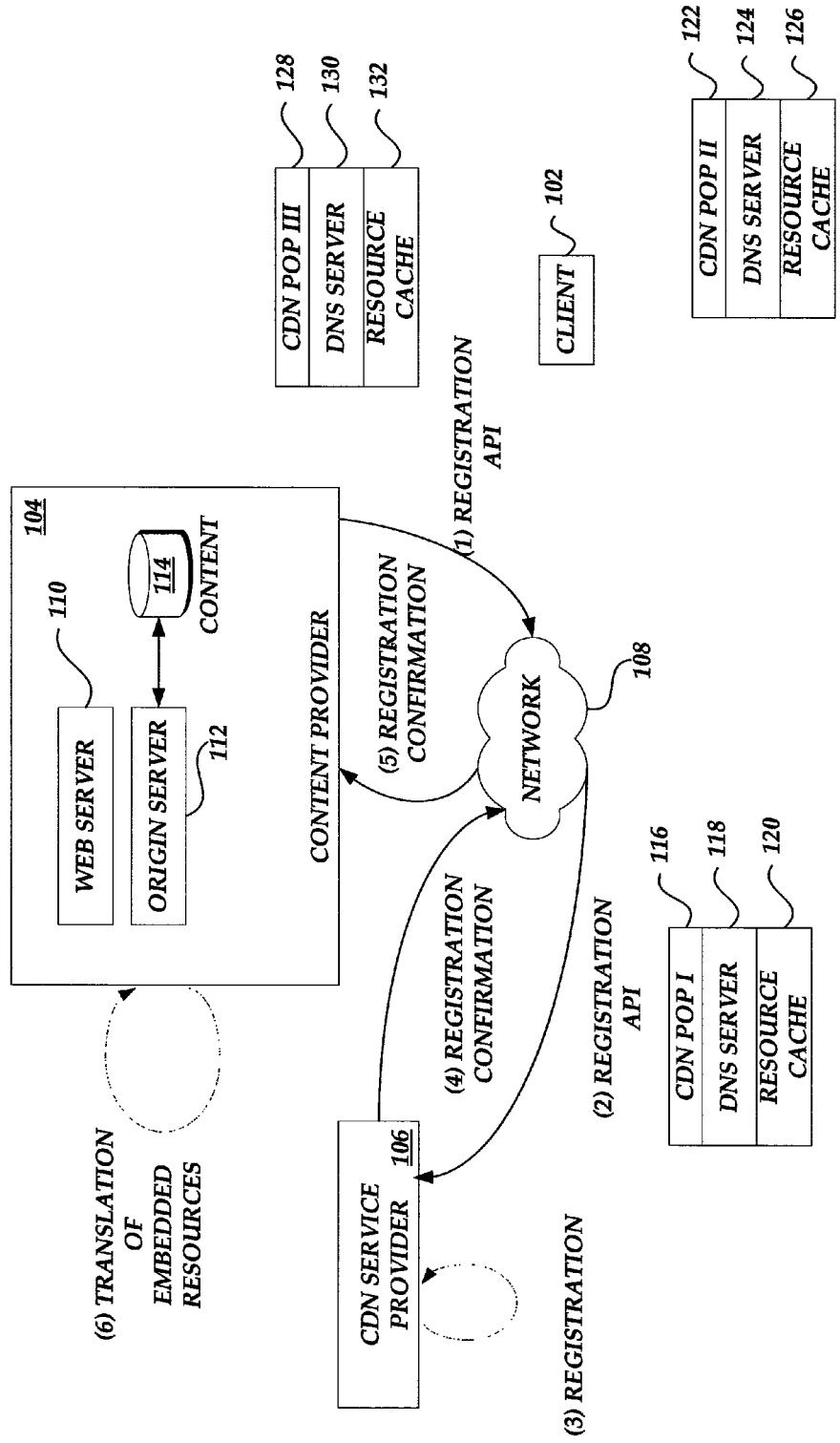
FIG. 2 is a block diagram of the content delivery environment of FIG. 1 illustrating the registration of a content provider with a content delivery service provider.

With reference to FIG. 2, an illustrative interaction for registration of a content provider 104 with the CDN service provider 106 will be described. As illustrated in FIG. 2, the CDN content registration process begins with registration of the content provider 104 with the CDN service provider 106. In an illustrative embodiment, the content provider 104 utilizes a registration application program interface ("API") to register with the CDN service provider 106 such that the CDN service provider 106 can provide content on behalf of the content provider 104. The registration API includes the identification of the origin server 112 of the content provider 104 that will provide requested resources to the CDN service provider 106. Additionally, as will be explained in greater detail below, the content provider 104 can also provide additional information, such as regional service plan information or other routing criteria, utilized by the CDN service provider 106 to route content requests. In one embodiment, the routing criteria can include the specification of a particular regional service plan, which may limit the regions from which content requests may be resolved by the CDN service provider 106. In another embodiment, the routing criteria can include a selection by the content provider 104 that the CDN service provider 106 should attempt to service specific resource requests from a particular regional destination or POP or from a particular distribution of regional destinations or POPs.

One skilled in the relevant art will appreciate that upon identification of appropriate origin servers 112, the content provider 104 can begin to direct requests for content from client computing devices 102 to the CDN service provider 106. Specifically, in accordance with DNS routing principles, a client computing device request corresponding to a resource identifier would eventually be directed toward a POP 116, 122, 128 associated with the CDN service provider 106. In the event that the resource cache component 120, 126, 132 of a selected POP does not have a copy of a resource requested by a client computing device 102, the resource cache component will request the resource from the origin server 112 previously registered by the content provider 104.

With continued reference to FIG. 2, upon receiving the registration API, the CDN service provider 106 obtains and processes the registration information. In an illustrative embodiment, the CDN service provider 106 can then generate additional information that will be used by the client computing devices 102 as part of the content requests. The additional information can include, without limitation, content provider identifiers, such as content provider identification codes or origin server identifiers, executable code for processing resource identifiers, such as script-based instructions, and the like. One skilled in the relevant art will appreciate that various types of additional information may be generated by the CDN service provider 106 and that the additional information may be embodied in any one of a variety of formats.

The CDN service provider 106 returns an identification of applicable domains for the CDN service provider (unless it has been previously provided) and any additional information to the content provider 104. In turn, the content provider 104 can then process the stored content with content provider specific information. In one example, as illustrated in FIG. 2, the content provider 104 translates resource identifiers originally directed toward a domain of the origin server 112 to a domain corresponding to the CDN service provider. The translated URLs are embedded into requested content in a manner such that DNS queries for the translated URLs will resolve to a DNS server corresponding to the CDN service provider 106 and not a DNS server corresponding to the content provider 104. Although the translation process is illustrated in FIG. 2, in some embodiments, the translation process may be omitted in a manner described in greater detail below.

Generally, the identification of the resources originally directed to the content provider 104 will be in the form of a resource identifier that can be processed by the client computing device 102, such as through a browser software application. In an illustrative embodiment, the resource identifiers can be in the form of a uniform resource locator ("URL"). Because the resource identifiers are included in the requested content directed to the content provider, the resource identifiers can be referred to generally as the "content provider URL." For purposes of an illustrative example, the content provider URL can identify a domain of the content provider 104 (e.g., contentprovider.com), a name of the resource to be requested (e.g., "resource.xxx") and a path where the resource will be found (e.g., "path"). In this illustrative example, the content provider URL has the form of:

http://www.contentprovider.com/path/resource.xxx

During an illustrative translation process, the content provider URL is modified such that requests for the resources associated with the translated URLs resolve to a POP associated with the CDN service provider 106. In one embodiment, the translated URL identifies the domain of the CDN service provider 106 (e.g., "cdnprovider.com"), the same name of the resource to be requested (e.g., "resource.xxx") and the same path where the resource will be found (e.g., "path"). Additionally, the translated URL can include additional processing information (e.g., "additional information"). Specifically, as set forth above, in one illustrative embodiment, the additional information can include a content provider identifier.

Additionally, the translated URL can include any additional information utilized by the CDN service provider during the request routing information, including, but not limited to, service plan information, file identifiers, and the like. Such information may be included in the modified URL or may be omitted from the translated URL and obtained by the CDN service provider 106 during the request routing process, such as by a lookup according to a content provider identifier. The translated URL would have the form of:

http://additional_information.cdnprovider.com/path/resource.xxx

Figure 3:
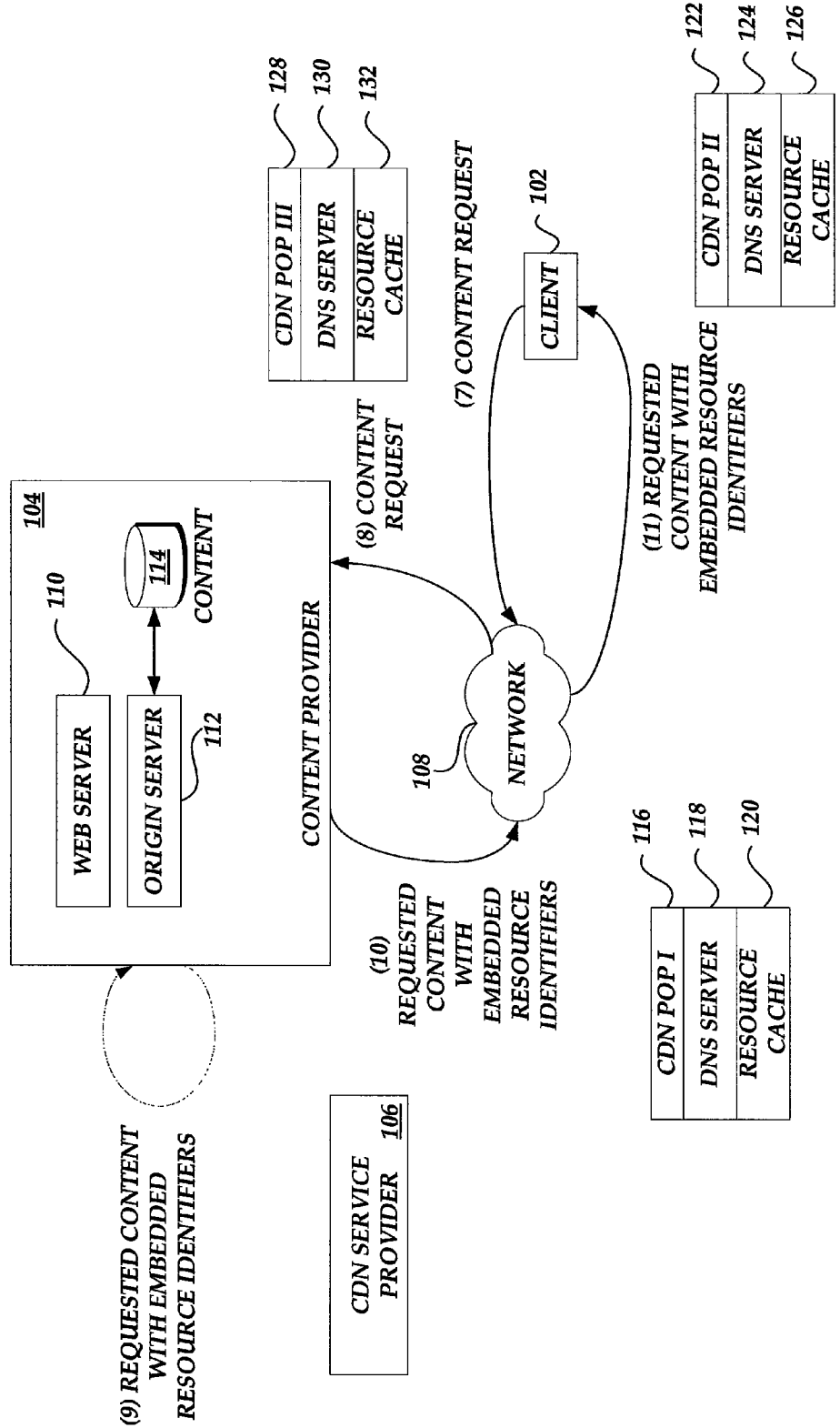
FIG. 3 is a block diagram of the content delivery environment of FIG. 1 illustrating the generation and processing of a content request from a client computing device to a content provider.

In another embodiment, the information associated with the CDN service provider 106 is included in the modified URL, such as through prepending or other techniques, such that the translated URL can maintain all of the information associated with the original URL. In this embodiment, the translated URL would have the form of:

http://additional_information.cdnprovider.com/www.contentprovider.com/path/resource.xxx With reference now to FIG. 3, after completion of the registration and translation processes illustrated in FIG. 2, a client computing device 102 subsequently generates a content request that is received and processed by the content provider 104, such as through the Web server 110. In accordance with an illustrative embodiment, the request for content can be in accordance with common network protocols, such as the hypertext transfer protocol ("HTTP"). Upon receipt of the content request, the content provider 104 identifies the appropriate responsive content. In an illustrative embodiment, the requested content can correspond to a Web page that is displayed on the client computing device 102 via the processing of information, such as hypertext markup language ("HTML"), extensible markup language ("XML"), and the like. The requested content can also include a number of embedded resource identifiers, described above, that corresponds to resource objects that should be obtained by the client computing device 102 as part of the processing of the requested content. The embedded resource identifiers can be generally referred to as original resource identifiers or original URLs.

Upon receipt of the requested content, the client computing device 102, such as through a browser software application, begins processing any of the markup code included in the content and attempts to acquire the resources identified by the embedded resource identifiers. Accordingly, the first step in acquiring the content corresponds to the issuance, by the client computing device 102 (through its local DNS resolver), of a DNS query for the original URL resource identifier that results in the identification of a DNS server authoritative to the "." and the "com" portions of the translated URL. After processing the "." and "com" portions of the embedded URL, the client computing device 102 then issues a DNS query for the resource URL that results in the identification of a DNS server authoritative to the ".cdnprovider" portion of the embedded URL. The issuance of DNS queries corresponding to the "." and the "com" portions of a URL are well known and have not been illustrated.

Figure 4A:
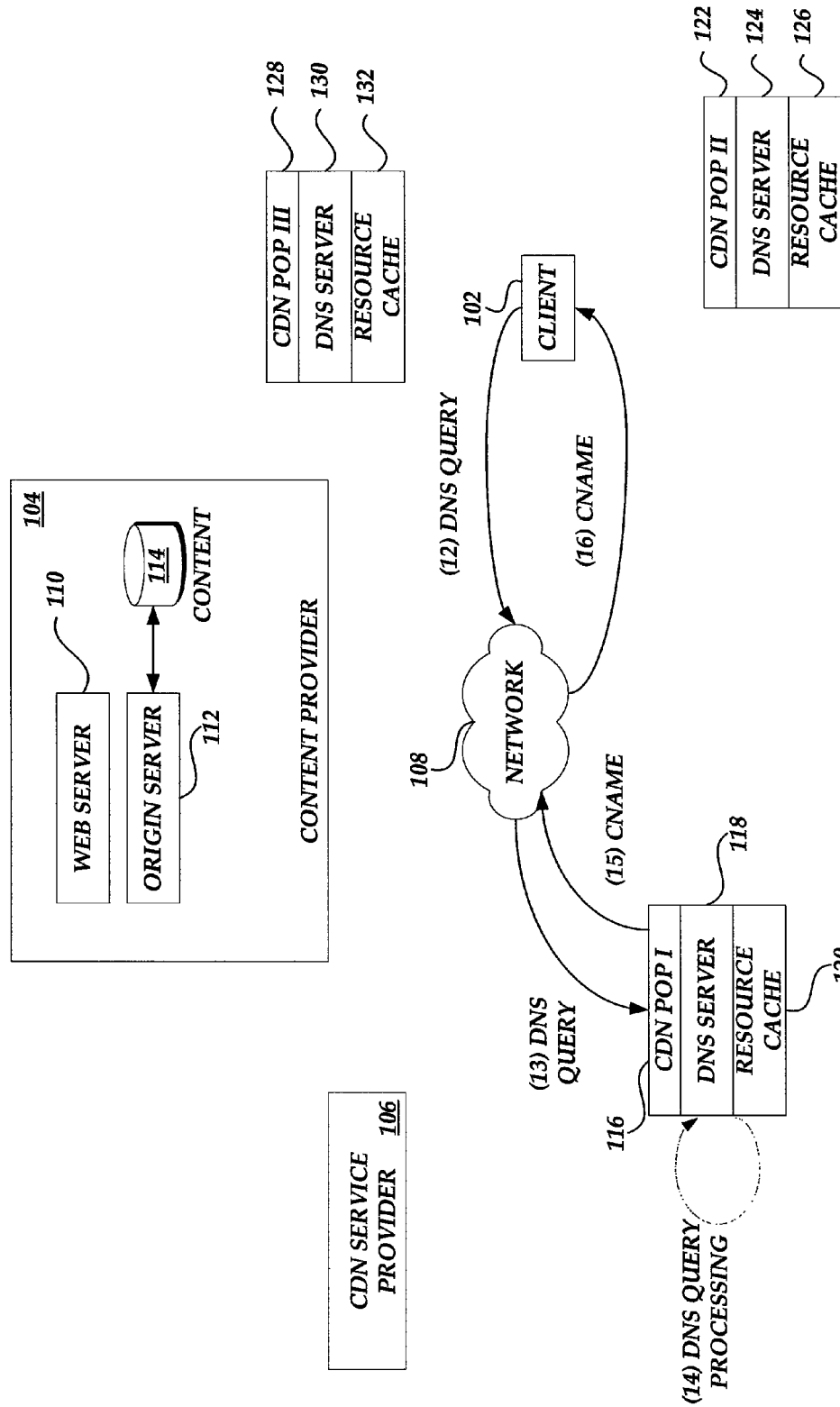
FIGS. 4A-4B are block diagrams of the content delivery environment of FIG. 1 illustrating one embodiment of the generation and processing of a DNS query corresponding to an embedded resource from a client computing device to a content delivery network service provider and the subsequent generation and processing of DNS queries corresponding to a first alternative resource identifier from a client computing device to a content delivery network.

With reference now to FIG. 4A, in an illustrative embodiment, the successful resolution of the "cdnprovider" portion of the original URL identifies a network address, such as an IP address, of a DNS server associated with the CDN service provider 106. In one embodiment, the IP address can be a specific network address unique to a DNS server component of a POP. In another embodiment, the IP address can be shared by one or more POPs. In this embodiment, a further DNS query to the shared IP address utilizes a one-to-many network routing schema, such as anycast, such that a specific POP will receive the request as a function of network topology. For example, in an anycast implementation, a DNS query issued by a client computing device 102 to a shared IP address will arrive at a DNS server component logically having the shortest network topology distance, often referred to as network hops, from the client computing device. The network topology distance does not necessarily correspond to geographic distance. However, in some embodiments, the network topology distance can be inferred to be the shortest network distance between a client computing device 102 and a POP.

With continued reference to FIG. 4A, in either of the above identified embodiments (or any other embodiment), a specific DNS server in the DNS component 118 of a POP 116 receives the DNS query corresponding to the original URL from the client computing device 102. Once one of the DNS servers in the DNS component 118 receives the request, the specific DNS server attempts to resolve the request. In one illustrative embodiment, as shown in reference to FIG. 5, a specific DNS server resolves the DNS query by identifying an IP address of a cache server component that will process the request for the requested resource. As described above and as will be described further below in reference to FIG. 6, a selected resource cache component can process the request by either providing the requested resource if it is available or attempt to obtain the requested resource from another source, such as a peer cache server computing device or the origin server 112 of the content provider 104.

Figure 5:
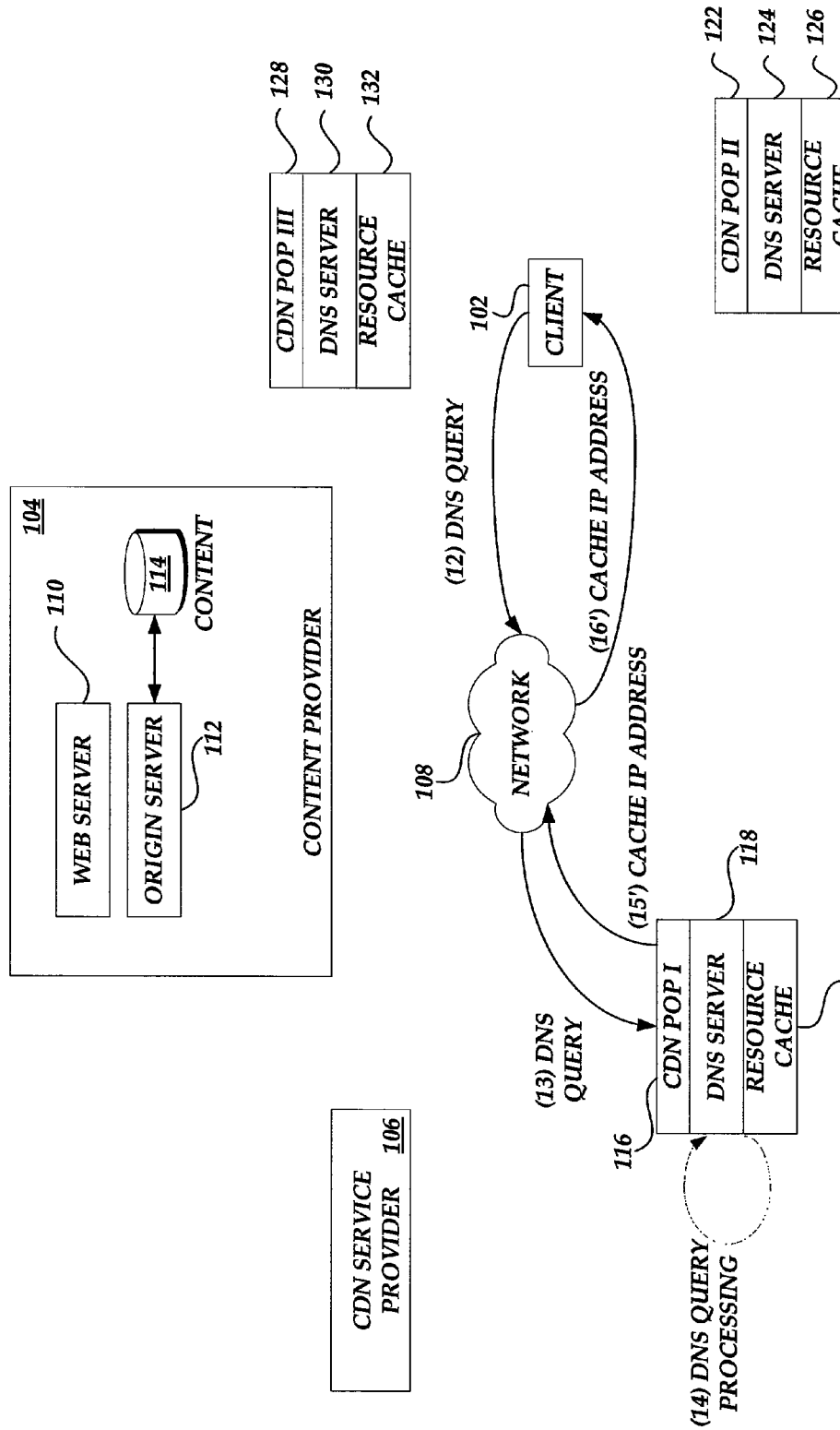
FIG. 5 is a block diagram of the content delivery environment of FIG. 1 illustrating another embodiment of the generation and processing of a DNS query corresponding to an embedded resource from a client computing device to a content delivery network service provider.

Returning to FIG. 4A, as an alternative to selecting a resource cache component upon receipt of a DNS query as described in reference to FIG. 5, the CDN service provider 106 can maintain sets of various alternative resource identifiers. The alternative resource identifiers can be provided by the CDN service provider 106 to the client computing device 102 such that a subsequent DNS query on the alternative resource identifier will be processed by a different DNS server component within the CDN service provider's network. In an illustrative embodiment, the alternative resource identifiers are in the form of one or more canonical name ("CNAME") records. In one embodiment, each CNAME record identifies a domain of the CDN service provider 106 (e.g., "cdnprovider.com" or "cdnprovider-1.com"). As will be explained in greater detail below, the domain in the CNAME does not need to be the same domain found in original URL or in a previous CNAME record. Additionally, each CNAME record includes additional information, such as request routing information, (e.g., "request routing information"). An illustrative CNAME record can have the form of:

http://request_routing_information.cdnprovider.com/path/resource.xxx

CNAME request_routing_information.cdnprovider.com

In an illustrative embodiment, the CNAME records are generated and provided by the DNS servers to identify a more appropriate DNS server of the CDN service provider 106. As used in accordance with the present disclosure, appropriateness can be defined in any manner by the CDN service provider 106 for a variety of purposes. In an illustrative embodiment, as will be described in greater detail below in reference to FIGS. 7 and 8, the CDN service provider 106 will utilize client location information associated with the client computing device 102 or its local DNS resolver, at least in part, to identify the more appropriate DNS server of the CDN service provider 106. In particular, the CDN service provider 106 can utilize an IP address associated with a client computing device DNS query to identify a corresponding location-based identifier representing a possible location of the client computing device. The CDN service provider 106 can then, in turn, utilize the location-based identifier to identify a destination identifier representing a geographic region associated with the CDN service provider 106 from which the resource request should be resolved. Based on the destination identifier, the CDN service provider 106 can then select a POP 116, 122, 128 from a set of POPs that are capable of servicing resource requests for the destination corresponding to the destination identifier. In one example, if more than one POP is identified in the set, the CDN service provider 106 can utilize a distribution allocation for selecting a specific POP associated with the identified destination. In another example, once a POP is selected, the CDN service provider 106 can further use health information to determine whether the selected POP is available to service requests before providing the client computing device with a CNAME corresponding to the selected POP. One skilled in the art will appreciate that the above functionality is illustrative in nature and accordingly should not be construed as limiting.

As described above, in addition to the consideration of client location information (either of the end-client or its associated local DNS resolver component), the CDN service provider 106 can utilize the additional information (e.g., the "additional information") included in the translated URL to select a more appropriate DNS server. In one aspect, the CDN service provider 106 can utilize the additional information to select from a set of DNS servers identified as satisfying criteria associated with the client location information. In another aspect, the CDN service provider 106 can utilize the additional information to validate the DNS server selected in accordance with the client location information or to select an alternative DNS server previously selected in accordance with the client location information. In one example, the CDN service provider 106 can attempt to direct a DNS query to DNS servers according to additional geographic criteria. The additional geographic criteria can correspond to geographic-based regional service plans contracted between the CDN service-provider 106 and the content provider 104 in which various CDN service provider 106 POPs are grouped into geographic regions. Accordingly, a client computing device 102 DNS query received in a region not corresponding to the content provider's regional plan may be better processed by a DNS server in region corresponding to the content provider's regional plan.

In another example, the CDN service provider 106 can attempt to direct a DNS query to DNS servers according to service level criteria. The service level criteria can correspond to service or performance metrics contracted between the CDN service provider 106 and the content provider 104. Examples of performance metrics can include latencies of data transmission between the CDN service provider POPs and the client computing devices 102, total data provided on behalf of the content provider 104 by the CDN service provider POPs, error rates for data transmissions, and the like.

In still a further example, the CDN service provider 106 can attempt to direct a DNS query to DNS servers according to network performance criteria. The network performance criteria can correspond to measurements of network performance for transmitting data from the CDN service provider POPs to the client computing device 102. Examples of network performance metrics can include network data transfer latencies (measured by the client computing device or the CDN service provider 106, network data error rates, and the like.

In accordance with an illustrative embodiment, the DNS server maintains a data store that defines CNAME records for various original URLs. If a DNS query corresponding to a particular original URL matches an entry in the data store, the DNS server returns a CNAME record as defined in the data store. In an illustrative embodiment, the data store can include multiple CNAME records corresponding to a particular original URL. The multiple CNAME records would define a set of potential candidates that can be returned to the client computing device. In such an embodiment, the DNS server, either directly or via a network-based service, can implement additional logic in selecting an appropriate CNAME from a set of possible of CNAMEs. In an illustrative embodiment, each DNS server component 118, 124, 130 maintains the same data stores that define CNAME records, which can be managed centrally by the CDN service provider 106. Alternatively, each DNS server component 118, 124, 130 can have POP specific data stores that define CNAME records, which can be managed centrally by the CDN service provider 106 or locally at the POP 116, 122, 128. Still further, each DNS server computing device within the DNS server components 118, 124, 130 can utilize shared data stores managed by a respective POP or a local data store specific to an individual DNS server computing device.

The returned CNAME can also include request routing information that is different from or in addition to the information provided in the URL/CNAME of the current DNS query. For example, a specific regional plan can be identified in the "request_routing_information" portion of the specific CNAME record. A similar approach could be taken to identify service level plans and file management by including a specific identifier in the "request_routing_information" portion of the CNAME record. In another embodiment, request routing information can be found in the identification of a CDN service provider 106 domain different from the domain found in the current URL/CNAME. For example, a specific regional plan domain (e.g., "cdnprovider region1.com") could be used in the domain name portion of the specific CNAME record. Any additional request routing information can be prepended to the existing request routing information in the current URL/CNAME such that the previous request routing information would not be lost (e.g., serviceplan.regionalplan.cdnprovider.com). One skilled in the relevant art will appreciate that additional or alternative techniques and/or combination of techniques may be used to include the additional request routing information in the CNAME record that is selected by the DNS server component 118.

With continued reference to FIG. 4A, one skilled in the relevant art will appreciate that the DNS server may select (or otherwise obtain) a CNAME record that is intended to resolve to a more appropriate DNS server of the CDN service provider 106. It may be possible, however, that the same DNS server would also be authoritative for the subsequent DNS query for the CNAME to be provided to the client computing device. For example, a specific DNS server may be authoritative based on the client location information. Thus, returning a CNAME would still result in the DNS query arriving at the same DNS server (which may also be due in part to the client computing device's geography). In such an embodiment, the DNS server, such as DNS server component 118, may choose to resolve the future DNS query in advance.

Figure 4B:
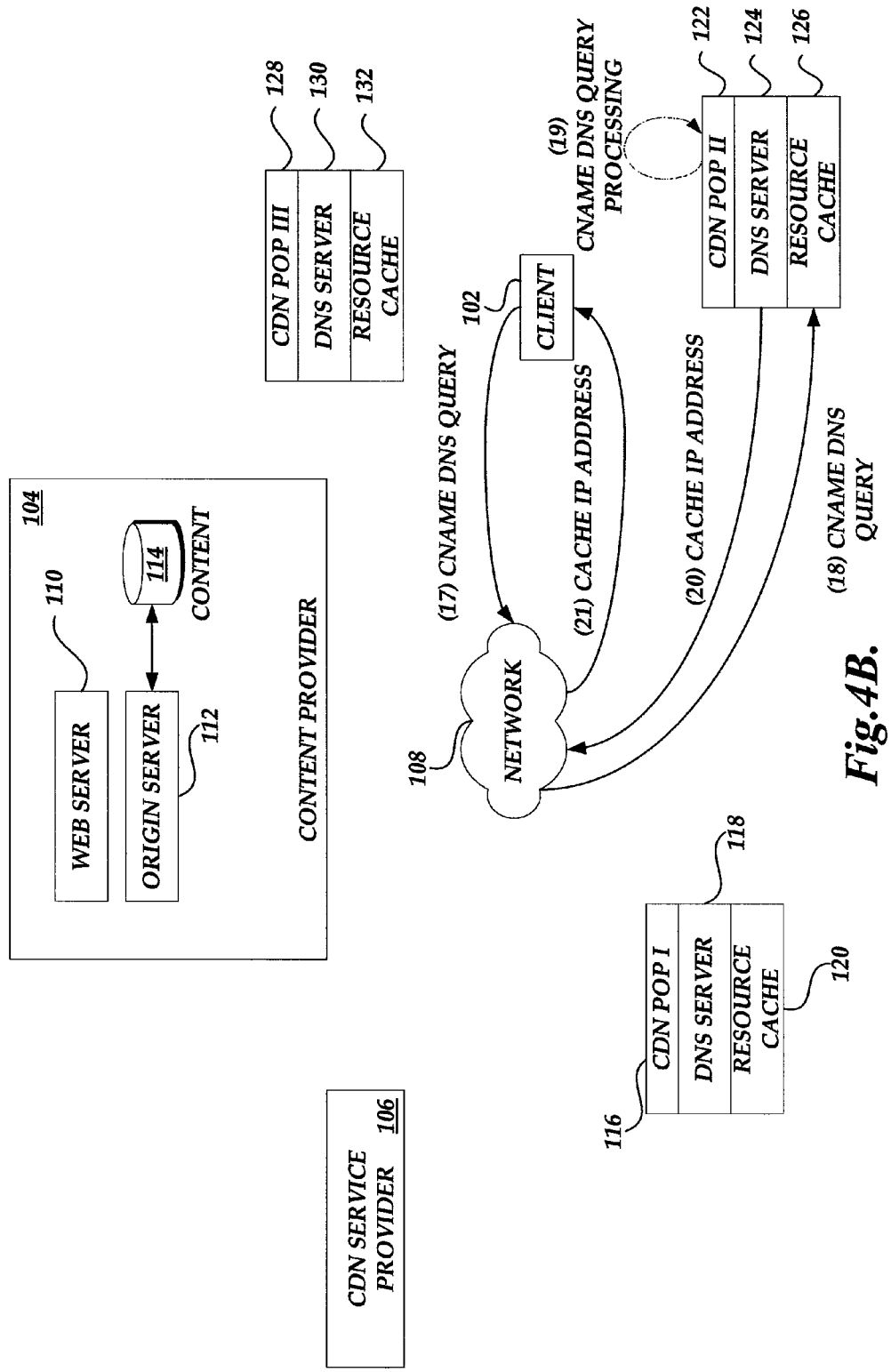

With reference now to FIG. 4B, upon receipt of the CNAME from the DNS server component 118, the client computing device 102 generates a subsequent DNS query corresponding to the CNAME. As previously discussed with regard to FIG. 4A, the DNS query process could first start with DNS queries for the "." and "com" portions, followed by a query for the "cdnprovider" portion of the CNAME. To the extent, however, that the results of a previous DNS queries can be cached (and remain valid), the client computing device 102 can utilize the cached information and does not need to repeat the entire process. However, at some point, depending on whether the CNAME provided by DNS server component 118 (FIG. 4A) and the previous URL/CNAME share common CDN service provider domains, the current CNAME DNS query will be processed by a different POP provided by the CDN service provider 106. As illustrated in FIG. 4B, the DNS server component 124 of POP 122 receives the current CNAME based on the different information in the current CNAME previously provided by the DNS server component 118. As previously described, the DNS server component 124 can then determine whether to resolve the DNS query on the CNAME with an IP address of a cache component that will process the content request or whether to provide another alternative resource identifier selected in the manners described above.

For purposes of illustration, assume that the DNS server component 124 processes the content request by returning an IP address of a resource cache component. In an illustrative embodiment, the DNS server component 124 can utilize a variety of information in selecting a resource cache component. In one example, the DNS server component 124 can default to a selection of a resource cache component of the same POP. In another example, the DNS server components can select a resource cache component based on various load balancing or load sharing algorithms. Still further, the DNS server components can utilize network performance metrics or measurements to assign specific resource cache components. The IP address selected by a DNS server component may correspond to a specific caching server in the resource cache. Alternatively, the IP address can correspond to a hardware/software selection component (such as a load balancer).

Figure 6:
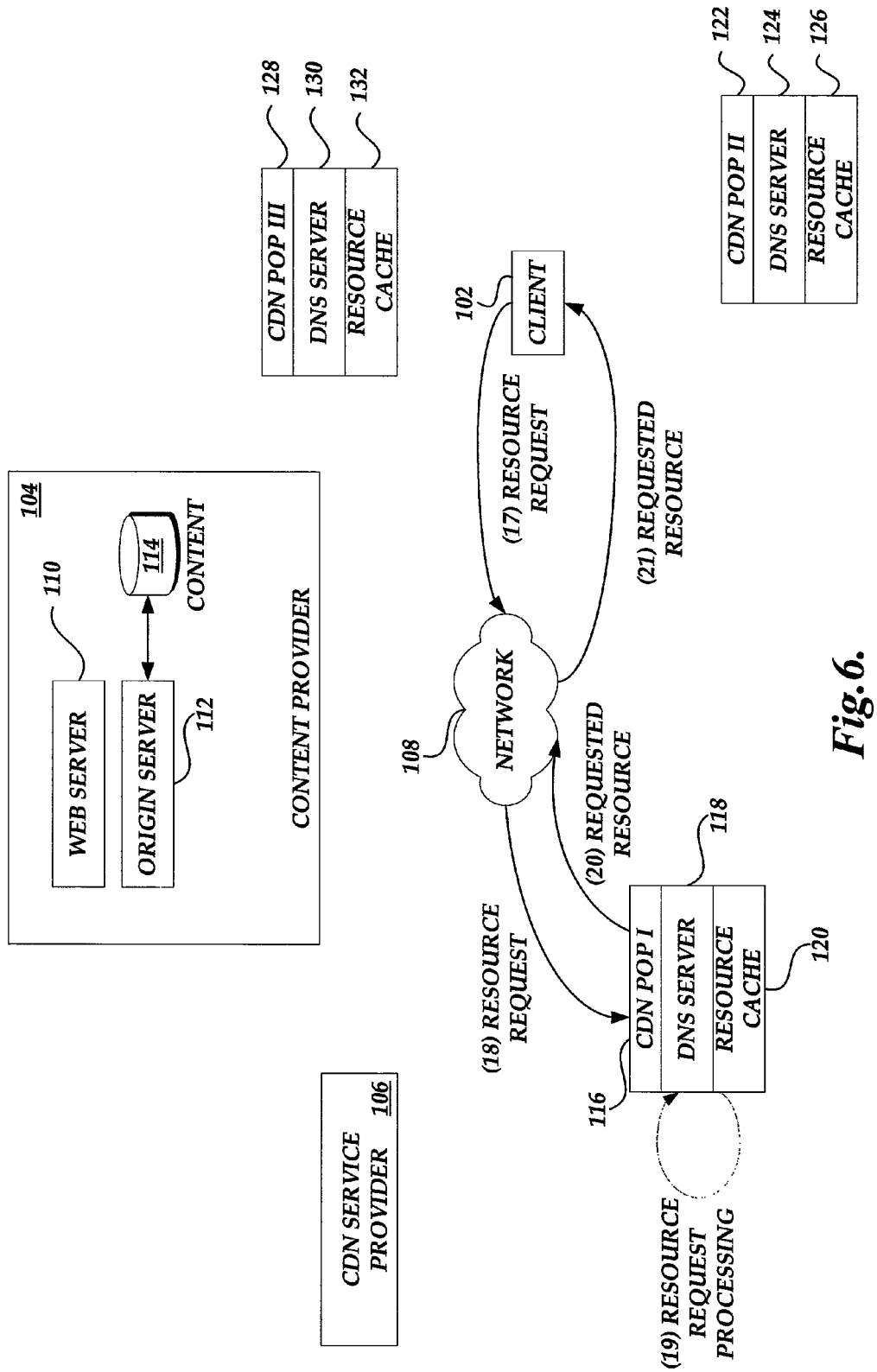
FIG. 6 is a block diagram of the content delivery environment of FIG. 1 illustrating the generation and processing of embedded resource requests from a client computing device to a content delivery network service provider.

With reference now to FIG. 6, in an illustrative example, assume that the DNS server component 124 has selected the resource cache component 126 of POP 122. Upon receipt of the IP address for the resource cache component 126, the client computing device 102 transmits a request for the requested content to the resource cache component 126. The resource cache component 126 processes the request in a manner described above and the requested content is transmitted to the client computing device 102.

Figure 7:
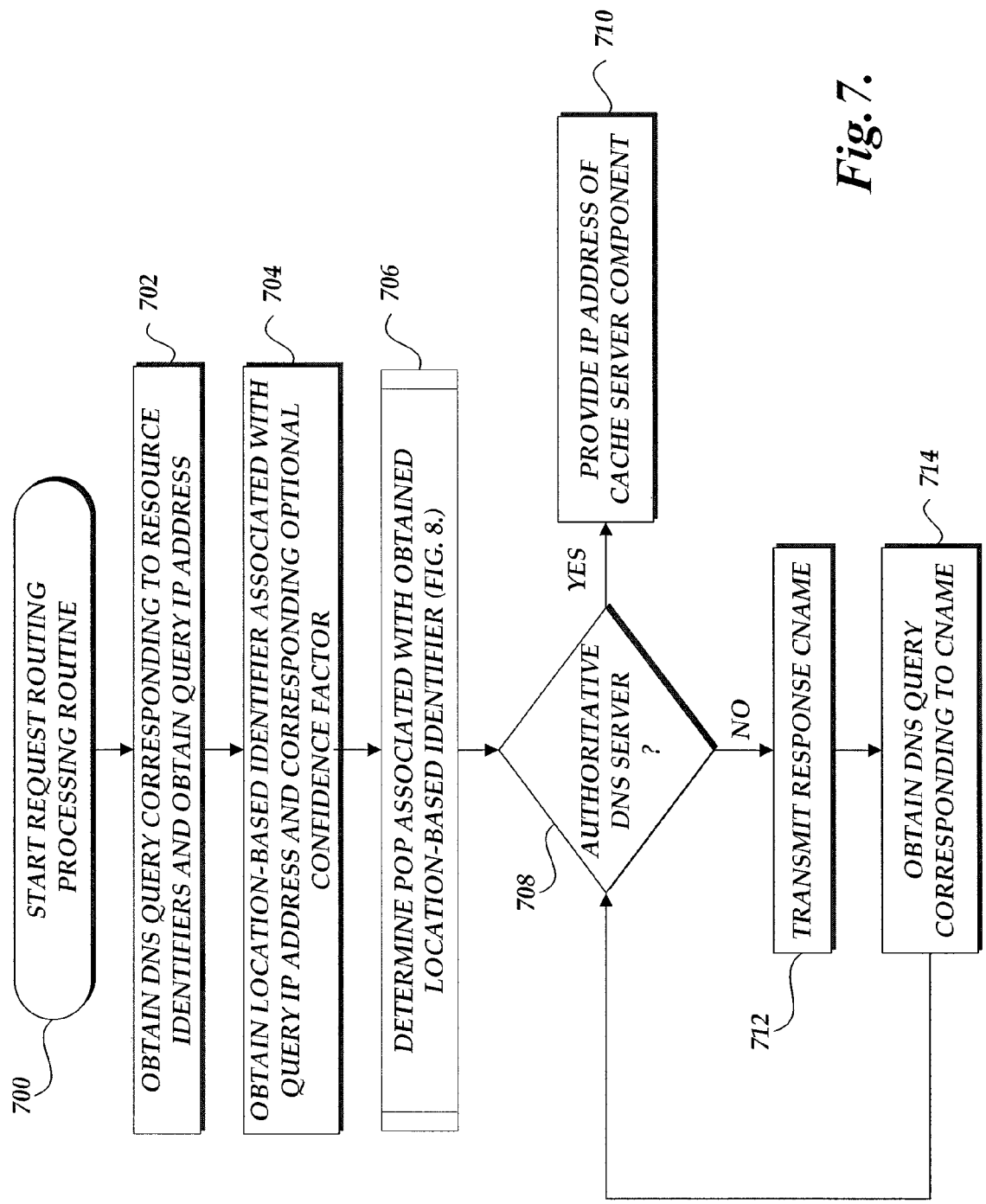
FIG. 7 is a flow diagram illustrative of a request routing routine implemented by a content delivery network service provider utilizing query IP address to location-based identifier mappings to process a resource request.

With reference now to FIG. 7, one embodiment of a request routine 700 implemented by the CDN service provider 106 for processing a resource request will be described. One skilled in the relevant art will appreciate that actions/steps outlined for routine 700 may be implemented by one or many computing devices/components that are associated with the CDN service provider 106. Accordingly, routine 700 has been logically associated as being generally performed by the CDN service provider 106, and thus the following illustrative embodiments should not be construed as limiting.

At block 702, one of the DNS server components 118, 124, 130 receives a DNS query corresponding to a resource identifier. As previously discussed, the resource identifier can be a URL that has been embedded in content requested by the client computing device 102 and previously provided by the content provider 104. Alternatively, the resource identifier can also correspond to a CNAME provided by a content provider DNS server in response to a DNS query previously received from the client computing device 102. The receiving DNS server also obtains an IP address associated with the DNS query from the requesting client computing device 102 ("query IP address") at block 702. The query IP address can correspond to an IP address of the client computing device or any local DNS resolver component associated with the client computing device.

Next, at block 704, the receiving DNS server obtains a location-based identifier associated with the query IP address. Each DNS server maintains (or otherwise has access to) a data store 134 mapping a set of location-based identifiers with at least portions of known IP addresses (e.g., mapping a specific location-based identifier with a specific IP address or specific partial IP address). Utilizing the data store 134, the receiving DNS server attempts to match the IP address associated with the client computing device 102 DNS query (as transmitted via the local DNS resolver component) with the IP addresses in the data store 134. If the query IP address can be partially matched to an IP address in the data store 134, the DNS server identifies a corresponding location-based identifier. As similarly set forth above, the location-based identifiers can correspond to locations directly determined based on physical locations or logical locations associated with the origin of the DNS query. Additionally, the location-based identifier can be inferred based on associating a relative location to known locations. For example, the location-based identifier can be attributed to known locations of POPs (corresponding to the CDN service provider) based on measured latency information associated with request routing between the client computing device or its local DNS resolver and these POPs. The measured latency information can be pre-measured, such as through testing procedures or previously observed request routing behavior. Alternatively, the measured latency information can be dynamically measured in a real time basis or semi-real time basis.

In an illustrative embodiment, the DNS server also optionally obtains a confidence factor associated with the location-based identifier from the data store 134 at block 704. The confidence factor corresponds to a degree of confidence in the accuracy of the associated location-based identifier to the query IP address. The optional confidence factor will be further discussed in reference to FIG. 8.

Figure 8:
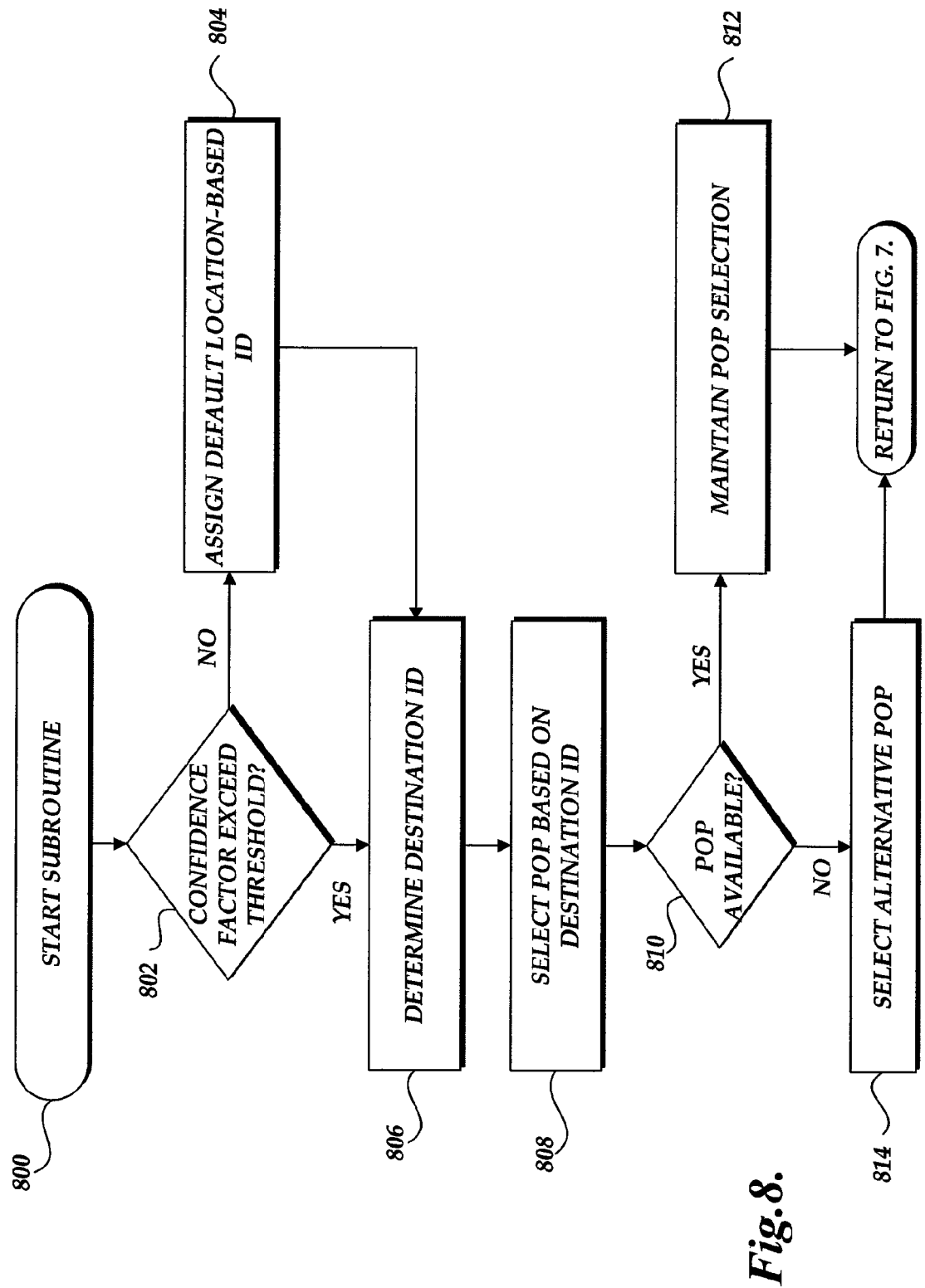
FIG. 8 is a flow diagram illustrative a request routing subroutine implemented by a content delivery network service provider in the illustrative flow diagram of FIG. 7 for determining a network point of presence for servicing a resource request based on an obtained location-based identifier.

Next, at a block 706, the receiving DNS server determines a POP from a set of one or more POPs associated with the obtained location-based identifier for resolving the resource request. Generally, the set of one or more POPs are capable of servicing resource requests from a region associated with the identified location of the requesting client computing device 102. As will be described further below, FIG. 8 illustrates one embodiment of a request routing subroutine for performing the functionality associated with block 706.

At decision block 708, a test is conducted to determine whether the current DNS server is authoritative to resolve the DNS query. In one illustrative embodiment, the DNS server can determine whether it is authoritative to resolve the DNS query if the determined POP for resolving the resource request corresponds to the same POP associated with the receiving DNS server. If the determined POP indeed corresponds to the same POP associated with the receiving DNS server, then the receiving DNS server is considered to be authoritative, and the receiving DNS server identifies a cache server associated with the resource cache component from the same POP to process a subsequent client resource request (e.g., a request for the embedded resource) at block 710. The receiving DNS server resolves the DNS query by returning the IP address of, for example, a default or specific cache server or a load balancing component (as appropriate) associated with the resource cache component from the same POP. A number of methodologies for selecting an appropriate resource cache component at the POP may be implemented.

Alternatively, if at decision block 708 the determined POP corresponds to another POP of the CDN service provider 106, and hence the receiving DNS server is not authoritative, the receiving DNS server selects and transmits an alternative resource identifier at block 712. Specifically, in one embodiment, the receiving DNS server identifies an appropriate CNAME corresponding to the selected POP and transmits the CNAME to the client computing device 102. At block 714, different DNS server components 118, 124, 130 then receive a DNS query from the client computing device 102 corresponding to the CNAME. The routine 700 then returns to decision block 708 and continues to repeat as appropriate.

Alternative or additional methodologies may also be practiced to determine whether the DNS server is authoritative. In one embodiment, the receiving DNS server may maintain one or more CNAMEs that define various alternatives for request routing processing based on geographic regions of the CDN service provider 106. In this embodiment, instead of determining a POP associated with the obtained location-based identifier at block 706, the receiving DNS server can determine a destination identifier associated with the obtained location of the client computing device, as will be similarly discussed below in reference to FIG. 8 at block 806. The DNS server in this alternative embodiment can then select an appropriate CNAME of an alternative POP based on the determined destination identifier alone or in combination with other request routing criteria.

With reference now to FIG. 8, one embodiment of a request routing subroutine 800 for selecting a POP associated with the location of the requesting client computing device will be described. One skilled in the relevant art will appreciate that actions/steps outlined for routine 800 may be implemented by one or many computing devices/components that are associated with the CDN service provider 106. Accordingly, routine 800 has been logically associated as being performed by the CDN service provider 106.

At decision block 802, where the receiving DNS server of the CDN service provider 106 has obtained a confidence factor associated with the location-based identifier (from block 704 of FIG. 7), a test is performed to determine whether the confidence factor exceeds a minimum threshold value. If the confidence factor does not exceed a minimum threshold, the DNS server assigns a default location-based identifier at block 804. In one embodiment, the default location-based identifier may correspond to the location of the receiving DNS server. If the confidence factor associated with the obtained location-based identifier exceeds the minimum threshold at block 802 or after a default location-based identifier is assigned at block 804, the receiving DNS server determines a destination identifier for the DNS query at block 806.

However, in an alternative embodiment, the foregoing functionality associated with obtaining and analyzing the confidence factor may be eliminated. In one embodiment, this functionality may instead be implemented as a preprocessing step such that the query IP address to location-based identifier mappings provided in the data store 134 already take a confidence assessment into consideration. For example, prior to generating the query IP address to location-based identifier mappings, any data mapping entry having a low confidence factor may be filtered out of the data mappings. The filtered query IP address to location-based identifier mappings may then be used by the CDN service provider 106 to determine a destination identifier at block 806.

Returning to block 806 of FIG. 8, in one embodiment, the receiving DNS server determines the destination identifier according to a manually generated table from the data store 134 in which the destination identifier is determined as a function of the location-based identifier. However, the receiving DNS server can also provide an alternative destination identifier in accordance with a manually initiated administrative process. One embodiment of the selection of the initial destination identifier and the manually initiated administrative process follows.

In an illustrative embodiment, the receiving DNS server utilizes the manually generated table mapping location-based identifiers to destination identifiers based on vector mapping and additional CDN administrator manipulation. The destination identifier corresponds to a definition of a geographic region encompassing one or more locations (e.g., a West Coast destination encompassing the states of Washington, Oregon and California). However, the DNS server may be configured to override the default destination identifier in accordance with a manually configured exception process determined as a function of the identity of the content provider (as obtained through the content provider identifier included in the DNS query).

In one embodiment, a CDN administrator can override the allocation of a destination identifier for specific content provider identifiers. For example, the DNS server can utilize the content provider identifier to ensure that the content provider's subscription with CDN service provider 106 allows content to be served from the destination identified in the mapping table. As another example, the content provider identifier can be manually designated to be associated with an alternative destination identifier to redistribute at least a portion of incoming resource requests for a particular content provider among several POPs (e.g., to avoid servicing content requests for a single web page via a single destination by offloading to a different destination).

Next, at block 808, based on the selected destination identifier, the receiving DNS server selects a POP from a list of one or more POPs that have been manually determined by the CDN administrator to be capable of servicing resource requests for the identified destination. If more than one POP is identified in the list of POPS, the receiving DNS server can select a specific POP according a specified distribution allocation for the corresponding destination (e.g., POP A (75%); POP B (25%)).

The receiving DNS server then determines whether the selected POP is available at decision block 810. In one embodiment, the DNS server evaluates the availability of the selected POP using POP health information indicative of the availability of the selected POP to process incoming resource requests. If the selected POP is available (as indicated via the POP health information), the receiving DNS server maintains the POP selection from block 808. Accordingly, the process will return to decision block 708 of FIG. 7, where if the receiving DNS server is not authoritative, the receiving DNS server returns a CNAME that will result in the receipt of the DNS query by the selected POP (or one of a set of identified POPs). If, however, the selected POP corresponds to the current POP of the receiving DNS server (i.e., the receiving DNS server is authoritative), the receiving DNS server resolves the DNS query by returning the IP address of the default resource cache component at the POP as the CNAME does not necessarily need to be provided (unless additional request routing processing will be implemented).

If the selected POP is not available (as indicated via the POP health information), the receiving DNS server can select an alternative POP at block 814 to process the DNS query. In one embodiment, the alternative POP can be selected via a failover list of alternative POPs that is manually set by a CDN administrator. Specifically, the receiving DNS server can select a specific alternative POP from the failover list according to a specified distribution. As similarly described above, processing will then return to decision block 708 of FIG. 7, where if the receiving DNS server is not authoritative for the alternative POP, the receiving DNS server returns a CNAME that will result in the receipt of the DNS query by the selected alternative POP (or one of a set of POPs). If, however, the selected alternative POP corresponds to the current POP of the receiving DNS server (i.e., the receiving DNS server is authoritative), the receiving DNS server resolves the DNS query by returning the IP address of the default resource cache component at the alternative POP as the CNAME does not necessarily need to be provided (unless additional request routing processing will be implemented).

It will be appreciated by those skilled in the art and others that all of the functions described in this disclosure may be embodied in software executed by one or more processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method comprising:
    as implemented by one or more computing devices configured with specific executable instructions,
        obtaining a DNS query from a client computing device at a first DNS server, wherein the DNS query corresponds to a requested resource associated with an original resource identifier provided by a content provider and wherein the first DNS server corresponds to a content delivery network service;
        obtaining a query IP address associated with the DNS query at the first DNS server, wherein the query IP address is associated with the client computing device;
        obtaining a location-based identifier associated with the query IP address and a confidence factor, the confidence factor corresponding to a degree of confidence associated with the accuracy of the location-based identifier to query IP address association;
        determining whether the confidence factor exceeds a threshold value; and
        if the confidence factor exceeds the threshold value:
            determining a destination identifier associated with the DNS query, wherein the destination identifier is determined based on the location-based identifier; and
            selecting a network point of presence associated with the content delivery network service provider based on the destination identifier.

2. The method as recited in claim 1 further comprising:
    determining whether the first DNS server is authoritative to the DNS query based on the selected network point of presence; and
    if the first DNS server is determined to be authoritative:
        selecting a cache component for providing content associated with the original resource request; and
        transmitting information identifying the selected cache component.

3. The method as recited in claim 1 further comprising assigning a location-based identifier associated with the first DNS server if the confidence factor does not exceed the threshold value.

4. The method as recited in claim 1, wherein the destination identifier corresponds to a geographic region encompassing a location associated with the location-based identifier.

5. The method as recited in claim 1 further comprising overriding the determined destination identifier based on the original resource identifier, wherein the original resource identifier provides information associated with an alternative destination identifier.

6. The method as recited in claim 1, wherein selecting a network point of presence comprises selecting a network point of presence from a set of network points of presence capable of servicing resource requests associated with the determined destination identifier.

7. The method as recited in claim 6, wherein the network point of presence is selected from the set of network points of presence based on a distribution allocation.

8. The method as recited in claim 1 further comprising:
    determining whether the selected network point of presence is available prior to determining whether the first DNS server is authoritative to the DNS query based on the selected network point of presence;
    if the selected network point of presence is available, maintaining the selected network point of presence; and
    if the selected network point of presence is not available, selecting an alternative network point of presence.

9. The method as recited in claim 1 further comprising overriding the determined destination identifier based on an identity of the content provider.

10. The method as recited in claim 9, wherein the determined destination identifier is overridden if the content provider's subscription with the content delivery network service provider does not provide for content to be provided from a destination corresponding to the destination identifier.

11. The method as recited in claim 9, wherein the determined destination identifier is overridden if the content provider's subscription with the content delivery network service provider provides for use of an alternative destination identifier.

12. A system for request routing comprising:
a first network point of presence associated with a content delivery network (CDN) service provider, wherein the first network point of presence includes a first DNS server that receives a DNS query from a client computing device, wherein the DNS query corresponds to a requested resource associated with a first resource identifier provided by a content provider, and wherein the first DNS server in the first network point of presence comprises at least one computing device associated with a memory and is operative to:
obtain a query IP address associated with the DNS query at the first DNS server, wherein the query IP address is associated with the client computing device;
obtain a location-based identifier associated with the query IP address and a confidence factor, the confidence factor corresponding to a degree of confidence associated with the accuracy of the location-based identifier to query IP address association;
determine whether the confidence factor exceeds a threshold value; and
if the confidence factor exceeds the threshold value:
determine a destination identifier associated with the DNS query, wherein the destination identifier is determined based on the location-based identifier; and
select a network point of presence associated with the content delivery network service provider based on the destination identifier.

13. The system as recited in claim 12, wherein the first DNS server in the first network point of presence is further operative to:
determine whether the first DNS server is authoritative to the DNS query based on the selected network point of presence; and
if the first DNS server is determined to be authoritative:
select a cache component for providing content associated with the original resource request associated with the first resource identifier; and
transmit information identifying the selected cache component.

14. The system as recited in claim 12, wherein the first DNS server in the first network point of presence is further operative to assign a location-based identifier associated with the first DNS server if the confidence factor does not exceed the threshold value.

15. The system as recited in claim 12, wherein the destination identifier corresponds to a geographic region encompassing a location associated with the location-based identifier.

16. The system as recited in claim 12, wherein the first DNS server in the first network point of presence is further operative to override the determined destination identifier based on the original resource identifier, wherein the original resource identifier provides information associated with an alternative destination identifier.

17. The system as recited in claim 12, wherein selecting a network point of presence comprises selecting a network point of presence from a set of network points of presence capable of servicing resource requests associated with the determined destination identifier.

18. The system as recited in claim 17, wherein the network point of presence is selected from the set of network points of presence based on a distribution allocation.

19. The system as recited in claim 12, wherein the first DNS server in the first network point of presence is further operative to:
determine whether the selected network point of presence is available prior to determining whether the first DNS server is authoritative to the DNS query based on the selected network point of presence;
if the selected network point of presence is available, maintain the selected network point of presence; and
if the selected network point of presence is not available, select an alternative network point of presence.

20. The system as recited in claim 12, wherein the first DNS server in the first network point of presence is further operative to override the determined destination identifier based on an identity of the content provider.

21. The system as recited in claim 20, wherein the determined destination identifier is overridden if the content provider's subscription with the content delivery network service provider does not provide for content to be provided from a destination corresponding to the destination identifier.

22. The system as recited in claim 20, wherein the determined destination identifier is overridden if the content provider's subscription with the content delivery network service provider provides for use of an alternative destination identifier.

* * * * *